United States Patent [19]

Yonemitsu et al.

[11] 3,952,072

[45] Apr. 20, 1976

[54] STABILIZED POLYPHENYLENE ETHER TYPE RESIN COMPOSITION

[75] Inventors: Eiichi Yonemitsu, Kashiwa; Akitoshi Sugio, Omiya; Masanobu Masu, Tokyo; Masaharu Kimura, Tokyo; Masao Okabe, Tokyo; Norio Sayama, Tokyo; Masatsugu Matsunaga, Matsudo, all of Japan

[73] Assignee: Mitsubishi Gas Chemical Company, Inc., Tokyo, Japan

[22] Filed: Nov. 14, 1974

[21] Appl. No.: 523,931

[30] Foreign Application Priority Data

Nov. 14, 1973 Japan.............................. 48-127920
Dec. 12, 1973 Japan.............................. 48-138990
Mar. 5, 1974 Japan.............................. 49-25557

[52] U.S. Cl. ............................ 260/874; 260/45.7 P; 260/45.7 PH; 260/45.8 R; 260/45.85 B; 260/45.9 NC; 260/45.95 D; 260/927 R; 260/928; 260/929; 260/930; 260/982

[51] Int. Cl.²............................................ C08J 3/20

[58] Field of Search............. 260/45.7 PH, 45.95 D, 260/45.9 NC, 45.85 B, 45.7 R, 45.8 R, 874

[56] References Cited
UNITED STATES PATENTS

| | | | |
|---|---|---|---|
| 3,465,062 | 9/1969 | Holoch et al................ | 260/45.9 NC |
| 3,483,271 | 12/1969 | Holoch et al................ | 260/45.9 NC |
| 3,578,625 | 5/1971 | Nakashio et al............. | 260/45.7 PH |
| 3,639,334 | 2/1972 | Holoch....................... | 260/45.9 NC |
| 3,639,508 | 2/1972 | Kambour..................... | 260/45.9 NC |
| 3,700,750 | 10/1972 | Yamanouchi et al. ...... | 260/45.7 PH |
| 3,761,541 | 9/1973 | Katchman et al. .......... | 260/45.7 PH |

*Primary Examiner*—V. P. Hoke
*Attorney, Agent, or Firm*—Sughrue, Rothwell, Mion & Zinn

[57] ABSTRACT

Stabilized polyphenylene ether type resin composition obtained by compounding a polyphenylene ether type resin with one or more of stabilizer-component such as those respectively (a) a high molecular phosphorous ester having at least three phosphorous ester-bondings per molecule, (b) a high molecular phosphorous ester as said above and dicarboxylic acid dihydrazide substitution product, (c) a high molecular phosphorous ester as said above and steric hindered phenols and (d) a high molecular phosphorous ester as said above, steric hindered phenols and dicarboxylic acid dihydrazide substitution product; and, if desired, boron oxide.

62 Claims, No Drawings

STABILIZED POLYPHENYLENE ETHER TYPE RESIN COMPOSITION

DETAILED DESCRIPTION OF THE INVENTION

This invention relates to stabilized polyphenylene ether type resin composition and more particularly it relates to thermally stabilized polyphenylene ether type resin composition obtained by compounding polyphenylene type ether resin with one or more of stabilizer components such as those respectively (a) a high molecular phosphorous ester having at least three phosphorous ether-bondings per molecule, (b) a phosphorous ester and dicarboxylic acid dihydrazide substitution product, (c) a high molecular phosphorous ester as said above and steric hindered phenols and (d) a high molecular phosphorous ester as said above, steric hindered phenol and dicarboxylic acid dihydrazide substitution product; and, if desired, boron oxide.

Although polyphenylene ether type resins are in general excellent in their physical and electrical characteristics and being thermoplastic resin having high heat distortion temperature, these are defective in their poor resistance against oxidation. Thus, these are easily degraded by the action of heat and ultraviolet rays, especially extremely low in their thermal stability in the presence of oxygen and are also discolored or brittle when these are exposed in air at an elevated temperature. These disadvantageous properties will restrict the molding characteristics of polyphenylene ether resins at an elevated temperature. For preventing their thermal degradation and facilitating their molding efficiency the other resins such as polystyrene are added to polyphenylene ether resins in order to reduce the molding temperature in the prior art, however, in these cases these are also discolored during molding process and also when the molded products thereof are exposed in air at a temperature above 100°C for long period change of color and deterioration of mechanical properties thereof can not be avoided. Said discoloration which will spoil their appearance and also such deterioration of the mechanical properties will restrict the wide availability of polyphenylene ether resins. For improving these disadvantageous properties, there have been proposed various devices for stabilizing thereof, for example by capping terminal hydroxyl radicals of polyphenylene ether with acetylation or by the addition of various thermal stabilizers, whereas satisfactory device is not yet found.

We have now surprisingly found after our studies of searching for thermal stabilizer of polyphenylene ether resins that thermal stability of polyphenylene ether resins can be extremely increased by the addition of a high molecular phosphorous ester having at least three phosphorous esterbonding per molecular to the said resins. And it was also found that when boron oxide is used together with said high molecular phosphorous ester more effective thermal stabilization can be obtained.

We have also found after our further studies that the thermal stability of polyphenylene ether resins can be increased by compounding a specified amount of dicarboxylic acid-dihydrazide substitution product therein. Also after our further studies it was found that a combination of said dicarboxylic acid-dihydrazide substitution product with high molecular phosphorous ester is extremely excellent in stabilizing of polyphenylene ether resins and also has a synergistic stabilizing effect which can not be obtained with each individual component as said above and then further object of the present invention could have been attained. Though the reason for the said synergistic effect is not yet clear, it is quite surprising that besides the said synergistic effects simultaneously the negative effects caused by each component said above can be disappeared. Thus said stabilizing effect included in the said novel combination is to be said as have never been anticipated basing on the effects of each individual component and is considered to have newly disclosed by the combination with polyphenylene ether resins.

We have also found after our further studies on the additives having thermal stabilizing effects that a combination of high molecular phosphorous ester and steric hindered phenols affords quite excellent thermal stabilizing effect and especially a combination of above said binary system with dicarboxylic acid dihydrazide substitution product is proved to be a quite effective thermal stabilizer extending over a long term.

When one component of these binary or ternary system is used solely its thermal stabilizing effect can of course be observed. However, in the thermal deterioration of resins, there is generally considered two kinds of thermal oxidative degradations, this is (1) thermal oxidative when maintained at a high temperature above melting point of resin such as those in the molding process and (2) thermal oxidative degradation when exposed at an environment temperature below softning point for long period and so the stabilizing effects capable of avoiding the thermal degradation against these two kinds of heat histries can not be attained by the use of any one of the said components individually.

Stabilizers such as low molecular phosphorous esters and steric hindered phenols are known and used solely or combined with the other stabilizers as shown in Japanese Patent Publication Nos. Sho 44-29751, Sho 46-42029 and Sho 46-42030. High molecular phosphorous ester having at least three phosphorous ester-bondings per molecule and having a molecular weight of more than 500 in quite novel and the combined system of high molecular phosphorous ester with steric hindered phenols and dicarboxylic acid dihydrazide substitution product exhibits quite excellent synergistic effect as thermal stabilizer of polyphenylene ether resins.

Also it has been usually practiced to use two or more of thermal stabilizers, whereas the quite excellent synergistic thermal stabilizing effect as attained by the present invention have never been achieved hitherto with respect to polyphenylene ether resins and this effect is quite astonishing and also said combination is to be said as could not have been anticipated in the prior art. Though the combination of high molecular phosphorous ester with steric hindered phenols as one of the composition of thermal stabilizers according to the invention shows excellent stabilizing effects, whereas when dicarboxylic acid dihydrazide substitution product according to the invention is combined with said binary system obtained ternary composition shows more excellent thermal stabilizing effects.

Polyphenylene ether type resins used throughout in the present invention include (i) polymers and copolymers produced by the oxidative polycondensation of a monovalent monocyclic phenols represented by the general formula

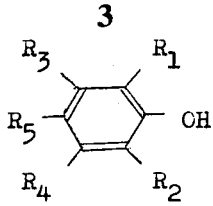

wherein $R_1$ represents a monovalent substituent selected from the group consisting of a hydrogen atom, alkyl radical, haloalkyl radical having at least two carbon atoms between halogen atom and nucleus, alkoxy radical, haloalkoxy radical having at least two carbon atoms between halogen atom and nucleus; $R_2$, $R_3$ and $R_4$ represent each monovalent radical selected from the above identified group or a halogen atom, wherein those in which $R_1$, $R_2$, $R_3$ and $R_4$ represent all hydrogen atom at the same time and those in which α-carbon atom is tertiary carbon are not included; and $R_5$ represents a substituent selected from the group consisting of a hydrogen, chlorine, bromine and iodine, and having polymeric segments consisting of more than 50 of recurring structural units, represented by the general formula

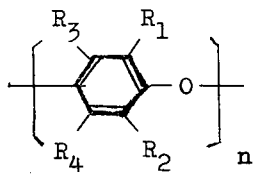

wherein $R_1$, $R_2$, $R_3$ and $R_4$ are as defined above and $n$ represents a positive integer of more than 50;

(ii) graft copolymer, wherein an alkenyl aromatic compound is grafted on said homopolymer or said copolymer; or (iii) a mixture of said homopolymer, said copolymer or said graft copolymer with other resins.

Preferable homopolymer as said above includes, for example, poly-2,6-dimethylphenol and the like. Copolymer as said above includes, for example, 2,6-dimethylphenol/2,3,6-trimethylphenol and the like. Preferable graft copolymer as said above includes for example styrene-grafted copolymer and the like. Preferable mixture of said polyphenylene ether (i) or said graft copolymer (ii) with other resins includes for example polyphenylene ether-polystyrene, polyphenylene ether-polychlorostyrene, polyphenylene ether-polymethyl styrene, polyphenylene ether-rubber modified polystyrene, polyphenylene ether-acrilonitrile/butadiene/styrene copolymer, polyphenylene ether-styrene butadiene rubber, polyphenylene ether-acrilonitrile butadiene rubber, 2,6-dimethylphenol/2,3,6-trimethyl phenol copolymer-rubber modified polystyrene, poly-2,6-dimethylphenol-2,3,6-trimethyl phenol/2,6-dimethyl phenol copolymer-polystyrene, styrene-grafted polyphenylene ether-rubber modified polystyrene, polyphenylene ether-polystyrene-styrene butadiene rubber, polyphenylene ether-polystyrene-polycarbonate-polyolefine and the like. Typical monovalent, monocyclic phenols include for example, 2,6-dimethylphenol, 2-methyl-6-ethylphenol, 2,6-diethylphenol, 2,3,6-trimethylphenol, 2,6-dimethoxyphenol, 2-methyl-6-methoxyphenol, 2,6-dimethyl-3-ethyl phenol, 2-methyl-6-n-propylphenol, 2-methyl-6-i-propylphenol, 2-methyl-6-phenylphenol, 2-ethyl-6-phenylphenol, 2,6-diphenylphenol, 2,6-dimethyl-4-chlorophenol, 2,6-dimethyl-4-bromophenol and the likes.

The present invention is grounded on these findings as mentioned above.

Accordingly, it is an object of our invention to provide a stabilied polyphenylene ether resin composition comprising (a) a high molecular phosphorous ester having at least three phosphorous ester bondings per molecule which may be obtained by reacting a compound selected from the group consisting of bisphenol A, hydrogenated bisphenol A, alkyl-substituted bisphenol A, halogenated bisphenol A, p-xylene glycol, 1,4-cyclohexan-dimethanol and pentaerythrite with a phosphorous acid or phosphorous ester represented by the formula (I)

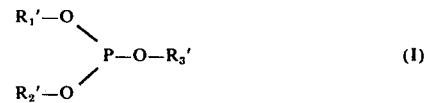

wherein $R_1'$, $R_2'$ and $R_3'$ represent each a hydrogen, aryl, alkyl or haloalkyl group; and (b) polyphenylene ether resins.

It is also another object of our invention to provide a stabilized polyphenylene ether resin composition comprising the composition as mentioned above and boron oxide.

As for the high molecular phosphorous esters used in the present invention as stabilizer are represented, for example, by the general formulae:

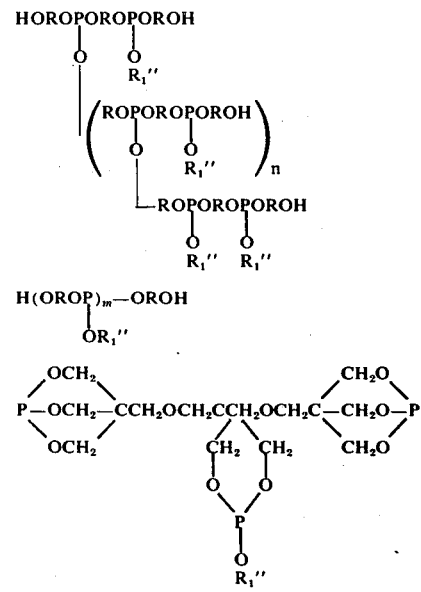

wherein R represents

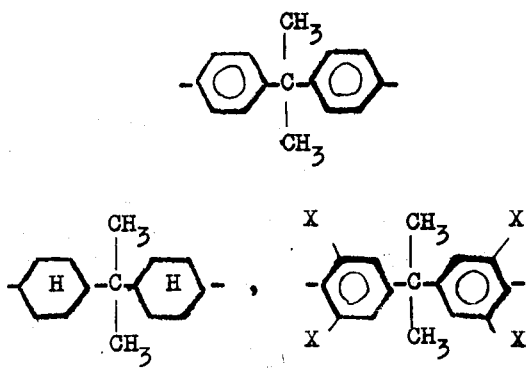

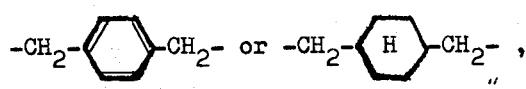
X represents an alkyl group or halogen atom; $R_1''$ represents aryl, alkyl or haloaryl group; $n$ is 0 or a positive integer; $m$ is an integer of 3 or more.
Examples of these high molecular phosphorous esters are shown for example as set forth under, however, not limited in these, as follows:
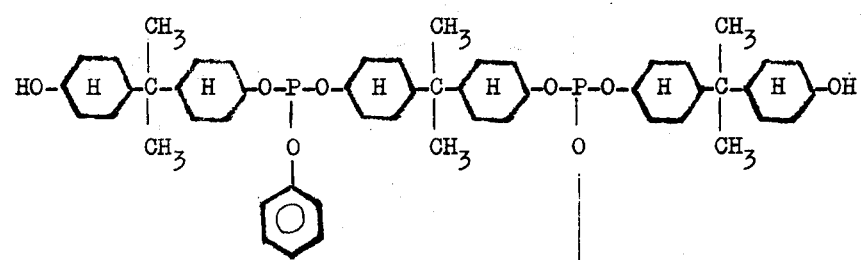
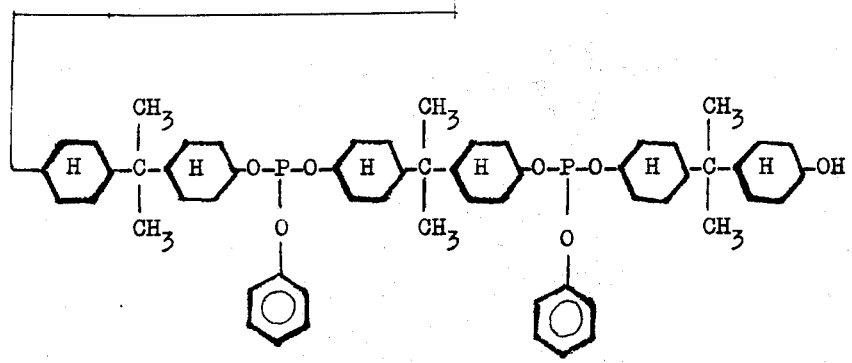
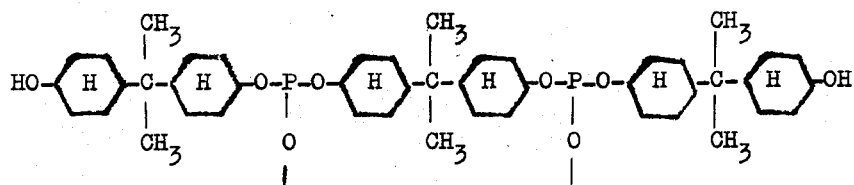
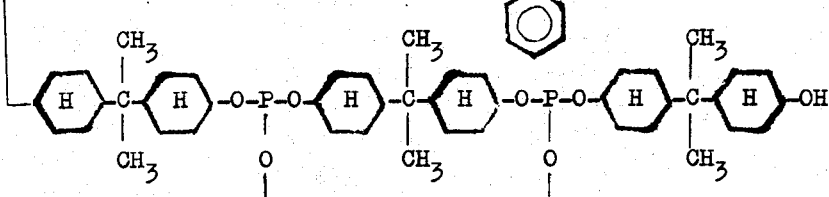
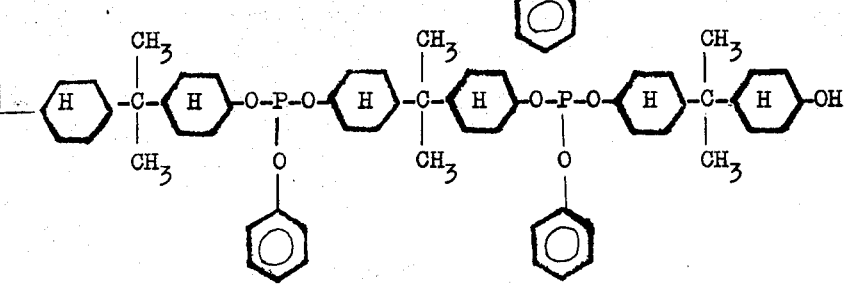

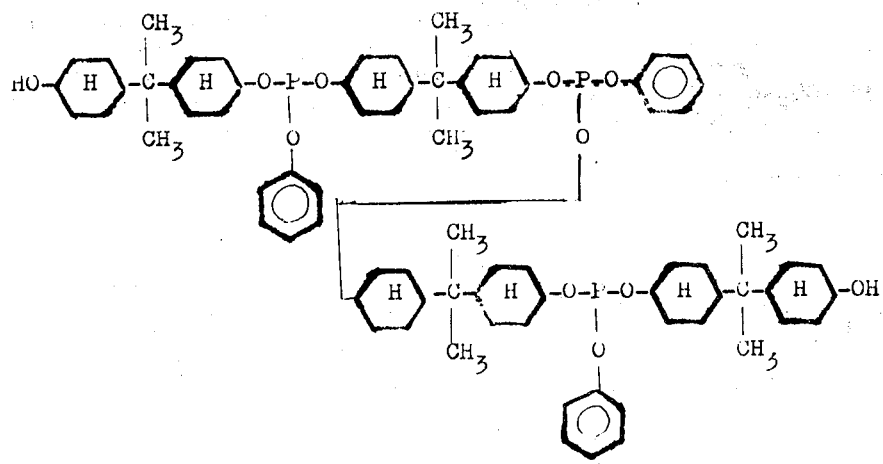
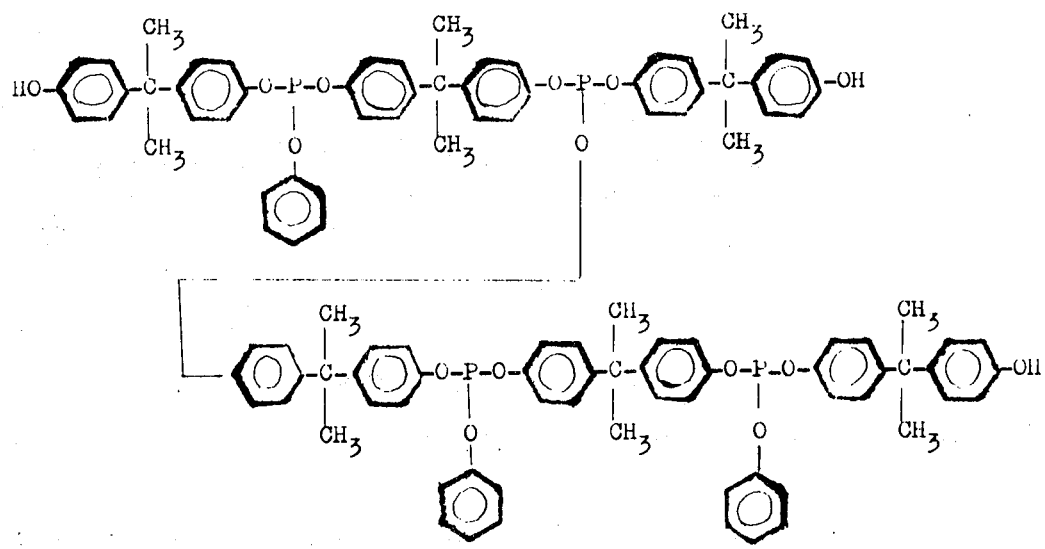
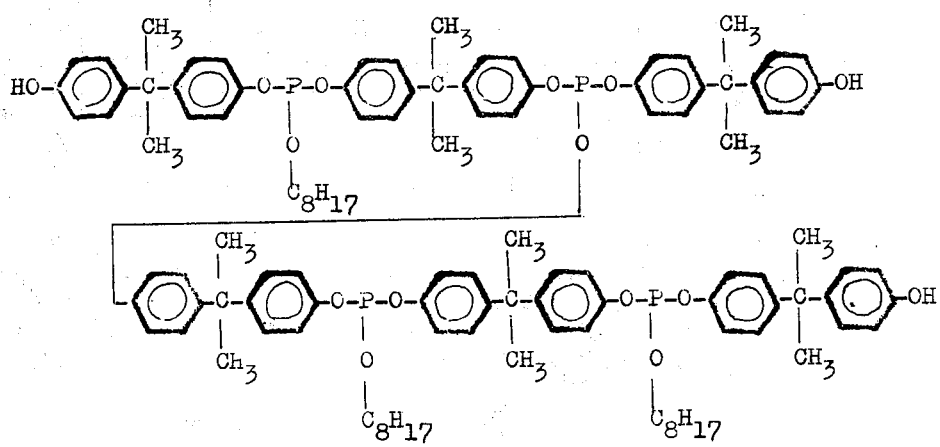

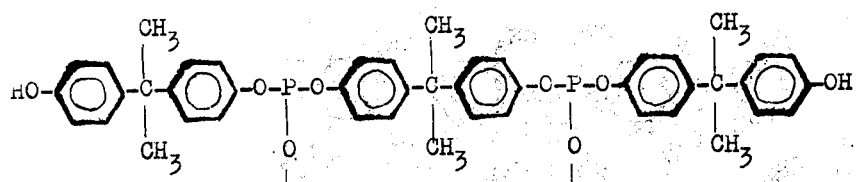
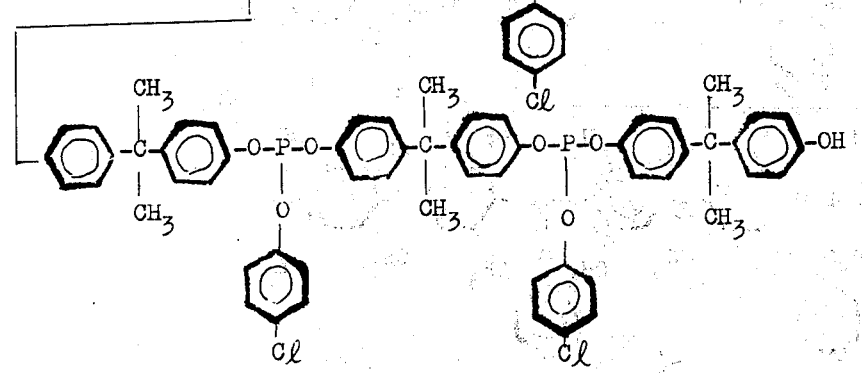
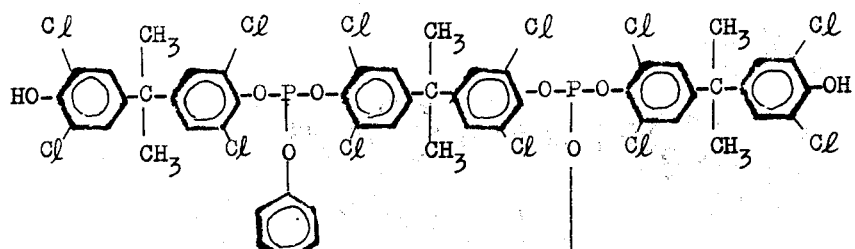
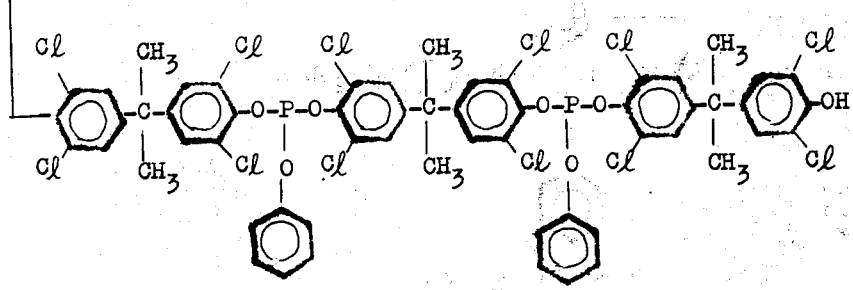
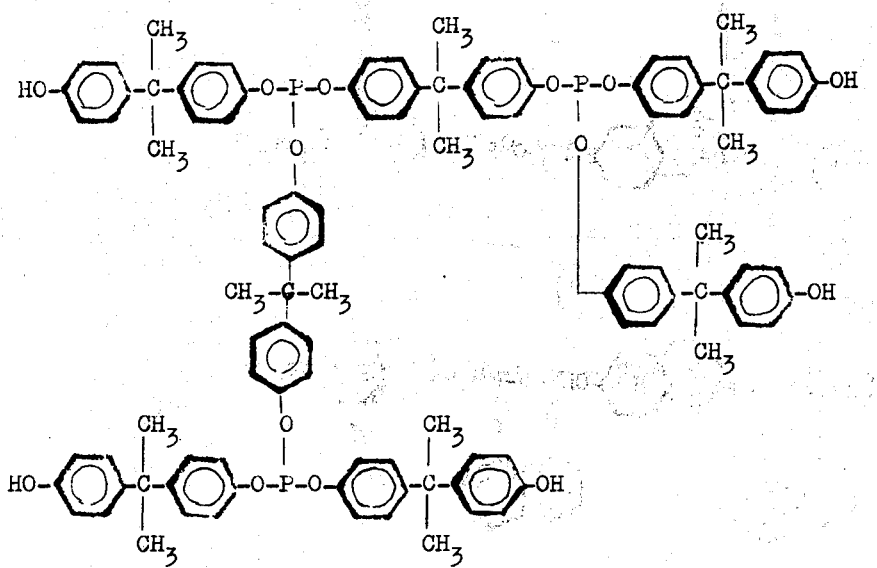

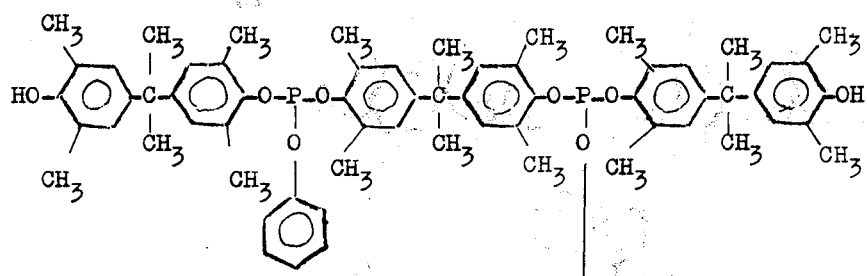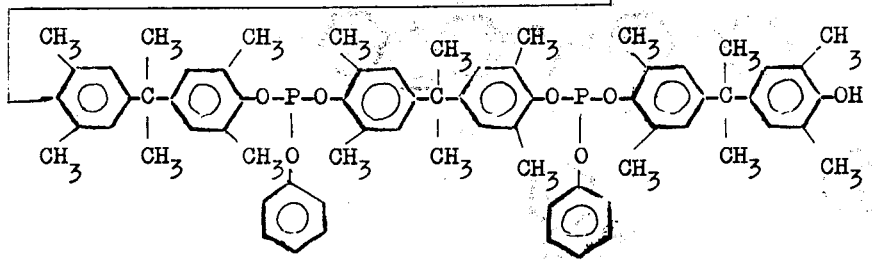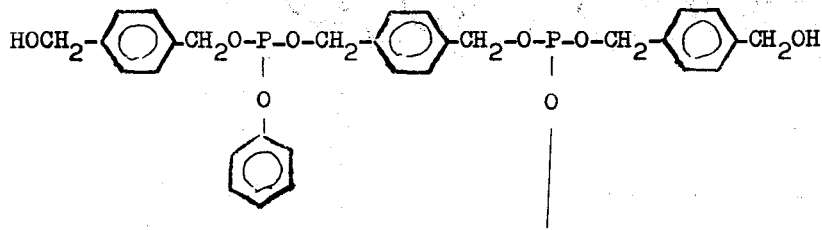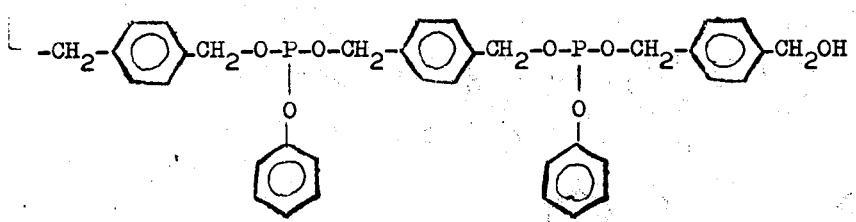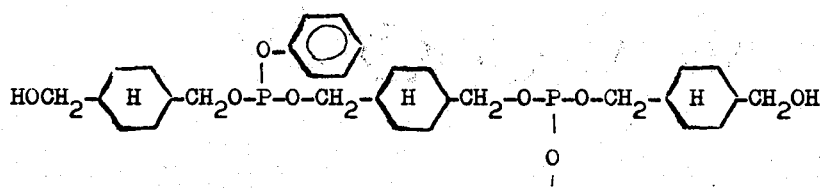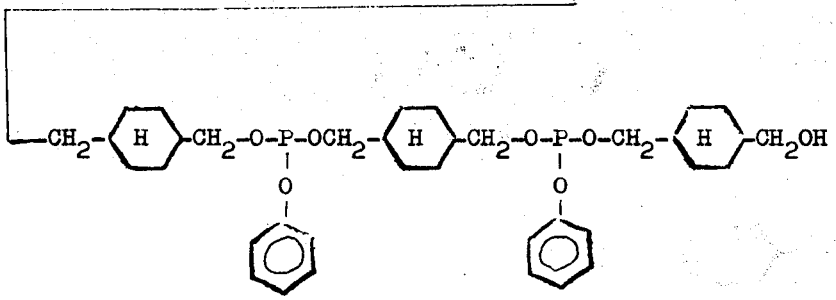

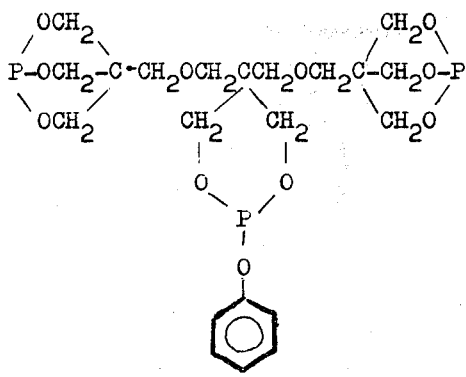

These high molecular phosphorous esters as mentioned above may be obtained by esterification or interchange of ester radicals or a compound selected from the group consisting of bisphenol A, hydrogenated bisphenol A, alkyl substituted bisphenol A, halogenated bisphenol A, p-xylylene glycol, 1,4-cyclohexane dimethanol and pentaerythrit with a phosphorous acid or ester.

In the compositions according to the invention as said above a high molecular phosphorous ester is used as stabilizer, however, low molecular phosphorous esters such as shown by the afore-mentioned general formula (I) wherein $R_1$, $R_2$ and $R_3$ represent each alkyl, aryl, haloalkyl or haloaryl radical, are not included in the said composition. When low molecular phosphorous ester is added to polyphenylene ether resins, the appearance of the molded product will be spoiled especially in the extrusion molding as well as injection molding and since the boiling point thereof is low, a large extent of volatilization and transfer of the material take place. Furthermore, since low molecular phosphorous esters are liquid form, these can not but being added after preliminary blending with master batch process together with a small amount of powdery materials or being added to the material to be molded by dissolving it in a solvent followed by evaporation of the solvent. Even if the molecular weight of the phosphorous ester is increased by enlarging the size of the substituents thereof, its thermal stabilizing effect will decrease, because the content of phosphorous ester-bondings will be reduced.

The amount of high molecular phosphorous ester to be added to polyphenylene ether resins according to the invention is in the range of from 0.01 to 10%, preferably from 0.1 to 3%, and there is no limitation in the method for compounding thereof in the composition.

Although the thermal stabilizing effect according to the invention is sufficient enough merely by compounding said phosphorous ester as stated above, the said effect can be more improved by combining said ester with boron oxide and in this case the amount of phosphorous ester to be added may be reduced. The amount of boron oxide to be added is in the range of from 0.01 to 5 percent, preferably from 0.05 to 2 percent. These thermal stabilizers may be added per se to resin powder or may be added after dissolving these in a solvent capable of dissolving both or one of these followed by evaporation of the solvent.

Thus stabilized polyphenylene ether resin composition may contain ultraviolet-absorbing agent, metalic soap, pigments, dyes, plasticizers, flame retarder and so on.

According to the above said combination, extremely stabilized polyphenylene ether resin composition against heat and oxidation can be obtained.

High molecular phosphorous esters according to the invention do not deteriorate the physical characteristics of polyphenylene ether resins such as melt-flow, discoloration, appearance, etc. and is also low transfer property with respect to transfer by thermal volatilization and extraction and is quite effective for long period of stabilization of polyphenylene ether resin material to be molded.

It is another object of our invention to provide a stabilized polyphenylene ether resin composition, comprising (a) dicarboxylic acid dihydrazide substitution product (II) represented by the general formula

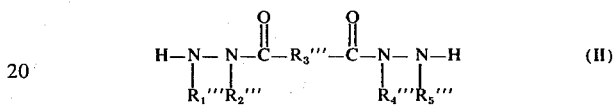

wherein $R_1'''$ and $R_5'''$ represent each an alkyl, acyl, alkoxy, or aryl radical and $R_2'''$ and $R_4'''$ represent each a hydrogenatom, alkyl or aryl radical and $R_3'''$ represents an alkylene or arylene radical;

(b) high molecular phosphorous ester; and
(c) polyphenylene ether resins.

As for the dicarboxylic acid dihydrazide substitution products as a component of stabilizer composition as said above according to the invention are represented by the general formula (II) as mentioned above, however, monohydrazine and its sutstitution products as well as dicarboxylic acid dihydrazide are not included therein.

Since for example hydrazine and its anhydride have low melting points, these are liable to volatilize or digest during molding process and also monohydrazine monosubstituted products such as 1,1'-acetyl-2-phenylhydrazine is not suitable for the stabilizer of polyphenylene ether resins because it shows a melting point of 170°C and is unstable at the molding process and causes the discoloration of the molded products. Although dicarboxylic acid dihydrazide substitution product has a tendency of increasing of molding-thermostability and thermal stability over long period as to the materials to be molded compared with those not added, the molded products are extremely spoiled in their appearance and also the addition thereof causes undesirable defective physical properties of the material to be molded by thermal decomposition. This may probably due to such a reason that since the molding temperature is at above 240°C the terminal hydrogen atom of the molecule of the stabilizer will react with oxygen to form nitroso radical and then this will cause the discoloration as said above.

Basing on the above said finding we have synthesized dicarboxylic acid dihydrazide substitution products by substituting at least one terminal hydrogen atom and the obtained products are used as a component of the stabilizer. Above-mentioned dicarboxylic acid dihydrazide substitution products applicable in the invention include for example malonic acid-bis-acetyl-hydrazide, malonic acid-bis-phenylhydrazide, malonic acid-bis-benzoylhydrazide, malonic acid-acetyl-phenyldihydrazide, malonic acid-bis-acetyl-phenylhydrazide, malonic acid-bis-acetyl-methylhydrazide, malonic acid-bismethylhydrazide, malonic acid-bis-methoxy hydrazide, succinic acid-bis-acetyl-hydrazide, succinic acid-bis-phenylhydrazide, succinic acid-bis-benzoylhydrazide, succinic acid-acetyl-phenyldihydrazide, succinic acid-bis-acetyl-phenylhydrazide, succinic acid-bis-acetyl-methylhydrazide, succinic acid-bis-methylhydrazide, glutaric acid-bis-acetyl-hydrazide, glutaric acid-bis-phenylhydrazide, glutaric acid-bis-benzoylhydrazide, glutaric acid acetyl-phenyldihydrazide, glutaric acid-bis-acetyl-phenylhydrazide, glutaric acid-bis-acetyl-methylhydrazide, glutaric acid-bis-methylhydrazide, glutaric acid-bis-methoxy hydrazide, adipic acid-bis-phenylhydrazide, adipic acid-bis-acetyl-phenylhydrazide, adipic acid-acetyl-phenyldihydrazide, adipic acid-bis-toluyl hydrazide, adipic acid-bis-acetyl-methylhydrazide, adipic acid-bis-methylhydrazide, suberic acid-bis-acetyl-hydrazide, suberic acid-bis-benzoylhydrazide, suberic acid-bis-phenylhydrazide, suberic acid-acetyl-phenyldihydrazide, suberic acid-bis-acetyl-phenylhydrazide, suberic acid-bis-acetyl-methylhydrazide, suberic acid-bis-methylhydrazide, suberic acid-bis-methoxy-hydrazide, azelaic acid-bis-acetyl-hydrazide, azelaic acid-bis-phenylhydrazide, azelaic acid-bis-benzoylhydrazide, azelaic acid-acetyl-phenyldihydrazide, azelaic acid-bis-acetyl-phenylhydrazide, azelaic acid-bis-acetyl-phenylhydrazide, azelaic acid-bis-acetyl-methylhydrazide, azelaic acid-bis-methylhydrazide, azelaic acid-bis-methoxyhydrazide, sebacic acid-bis-acetyl-hydrazide, sebacic acid-bis-phenylhydrazide, sebaic acid-bis-benzoylhydrazide, sebacic acid-acetyl-phenylhydrazide, sebacic acid-bis-toluyl hydrazide, sebacic acid-bis-acetyl-methylhydrazide, sebaic acid-bis-methylhydrazide, sebacic acid-bis-methoxy hydrazide, terephthalic-acid-bis-acetyl-hydrazide, terephthalic acid-bis-phenylhydrazide, terephthalic acid-bis-benzoylhydrazide, terephthalic acid-acetyl-phenyldihydrazide, terephthalic acid-bis-acetyl-phenylhydrazide, terephthalic acid-bis-toluylhydrazide, terephthalic acid-bis-acetyl-methylhydrazide, terephthalic acid-bis-methylhydrazide, terephthalic acid-bis-methoxy hydrazide, phthalic acid-bis-acetyl-hydrazide, phthalic acid-bis-phenylhydrazide, phthalic acid-bis-benzoylhydrazide, phthalic acid-acetyl-phenyldihydrazide, phthalic acid-bis-acetyl-phenylhydrazide, phthalic acid-bis-toluylhydrazide, phthalic acid-bis-acetyl-methylhydrazide, phthalic acid-bis-methylhydrazide, phthalic acid-bis-methoxy hydrazide, isophthalic acid-bis-acetyl-hydrazide, isophthalic acid-bis-phenylhydrazide, isophthalic acid-bis-benzoylhydrazide, isophthalic acid-acethyl-phenyldihydrazide, isophthalic acid-bis-acetyl-phenylhydrazide, isophthalic acid-bis-toluylhydrazide, isophthalic acid-bis-acetyl-methylhydrazide, isophthalic acid-bis-methylhydrazide, isophthalic acid-bis-methoxy hydrazide and so on, however, not only limited in these.

As for the high molecular phosphorous esters having at least three phosphorous ester-bondings per molecule used in this composition are quire the same with those explained in the aforementioned composition comprising a high molecular phosphorous ester having at least three phosphorous ester bonding per molecule and polyphenylene ether resins.

Accordingly as for the high molecular phosphorous esters used in this composition as stabilizer are represented for example also as aforementioned by the formulae

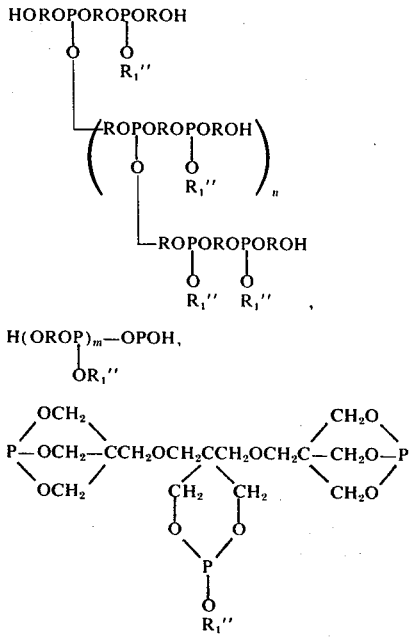

wherein R represents

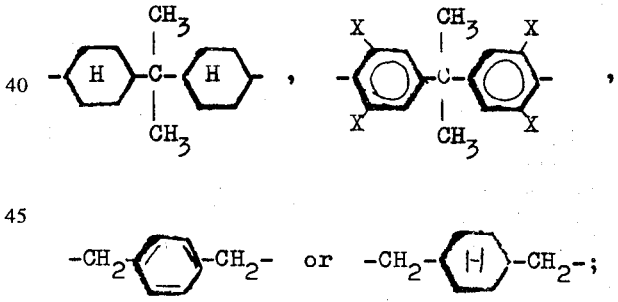

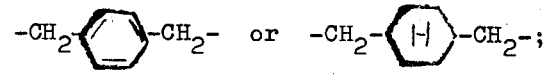

X represents an alkyl radical or halogen atom; $R_1''$ represents an alkyl, aryl, haloalkyl or haloaryl radical; $m$ is an integer of at least 3; $n$ is 0 or a positive integer and is selected so as to have a molecular weight of more than 500.

Also example of these high molecular phosphorous esters can be shown by the same examples with those aforementioned.

When said high molecular phosphorous ester is used in combination with said dicarboxylic acid dihydrazide substitution product (II) quite remarkable symergistic effects can be obtained for the stabilization of polyphenylene ether resins.

A stabilized polyphenylene ether resin composition according to the invention can be attained by compounding dicarboxylic acid dihydrazide substitution product and high molecular phosphorous ester respectively in an amount of 0.01 – 10 percent by weight, especially 0.05 – 2.0 percent by weight of polyphenylene ether resin component and there is no special limitation in their compounding process. Although the thermal stabilizing effects of this composition according to the invention may be attained sufficient enough merely by employing the combination of dicarboxylic acid dihydrazide substitution product with high molecular phosphorous ester as said above, said effects may be more increased by combining boron oxide thereto and in this case the amount of the above said stabilizers to be added may be reduced. The amount of boron oxide to be added is in the range of from 0.01 to 5 percent, preferably from 0.05 to 2 percent by weight of the resin.

The stabilized polyphenylene ether resin composition as said above may further contain ultraviolet-absorbing agent, metallic soap, pigments, dyes, plasticizers, flame retarder and so on.

According to the above said composition remarkably stabilized polyphenylene ether resin composition against thermal and oxidative action in an extremely wide temperature range can be obtained. The above said composition according to the invention affords a polyphenylene ether resin composition material to be molded and being stabilized against thermal oxidation for a long period without degrading melt flow property, appearance such as coloring or surface glass and mechanical, electrical, chemical and thermal properties of polyphenylene ether resins. Thus resin compositions as said above according to the invention are extremely useful in industrial field.

It is the other object of our invention to provide a stabilized polyphenylene ether resin composition comprising (a)

(A) a high molecular phosphorous ester which has a molecular weight of more than 500 and contains at least three phosphorous ester-bondings per molecule;

(B) a steric hindered phenols represented by the general formula

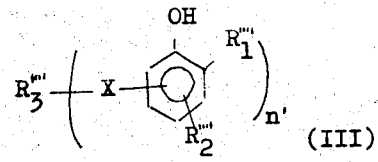

(III)

or

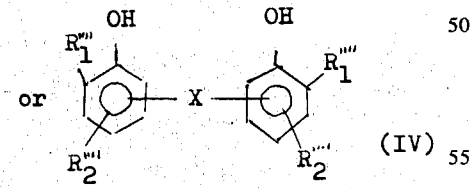

(IV)

wherein
$R_1''''$ and $R_2''''$ represent alkyl radical at least one is tert, buthyl radical;

X represents alkylene, arylene, alkyleneoxy, aryleneoxy,

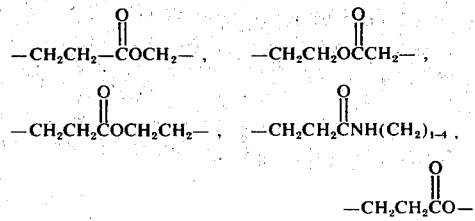

or —NH-radical;

$R_3$ represents a hydrogen atom, alkyl, aryl radical, carbon, oxygen or sulfer atom, triazino, substituted triazinoradical,

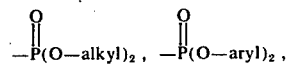

—C(alkylene-O)$_3$P or —C(alkylene-S)$_3$P;

$n'$ represents an integer of 1 – 4; or (b)

(A) and (B) as said above, and (C) a dicarboxylic acid dihydrazide substitution product of the general formula

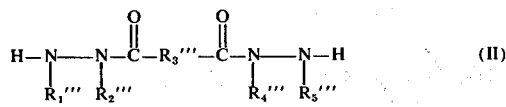 (II)

wherein $R_1'''$ and $R_5'''$ represent each an alkyl, acyl, alkoxy, aryl; $R_2'''$ and $R_4'''$ represent each a hydrogen atom, alkyl or aryl radical; and $R_3'''$ represents alkylene or arylene radical; and (c) a polyphenylene ether type resin.

As for the high molecular phosphorous esters having at least three phosphorous ester-bondings per molecule and a molecular weight of more than 500 used in the abovementioned composition as a stabilizer component, these are quite the same with those explained in the aforementioned composition consisting of high molecular phosphorous ester and polyphenylene ether resins according to the invention in their chemical structures and physical characteristics. Accordingly examples described therein are also all applicable in this case.

Steric hindered phenols used as another type of stabilizer in this composition are those represented by the general formulae (III, IV) mentioned above and when these are used in combination with said high molecular phosphorous ester (I), quite excellent synergistic effects can be attained for the stabilization of polyphenylene ether resins. Some typical examples of steric hindered phenols used in the present invention are shown, as below:

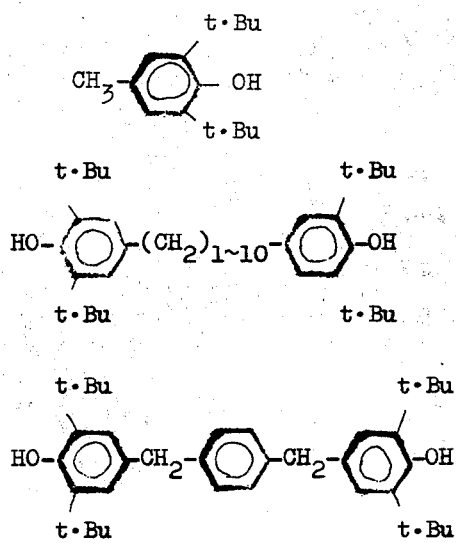

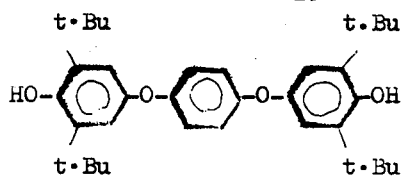
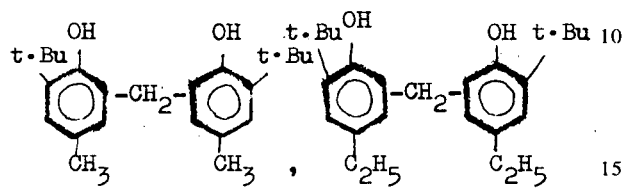
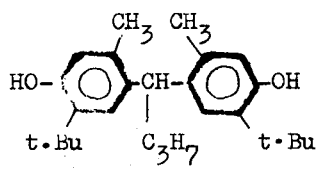
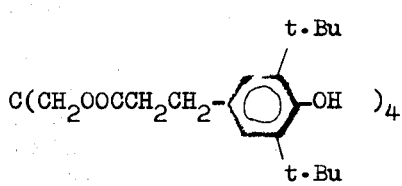
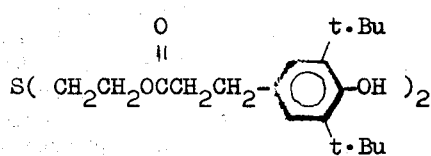
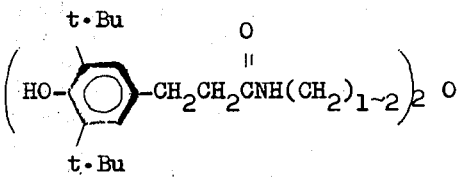
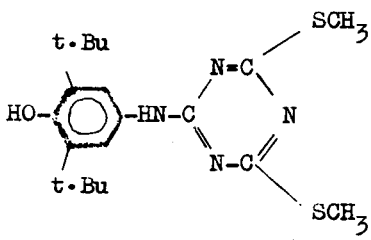
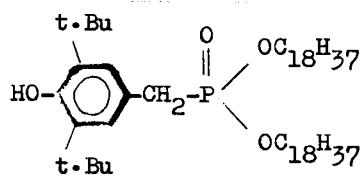
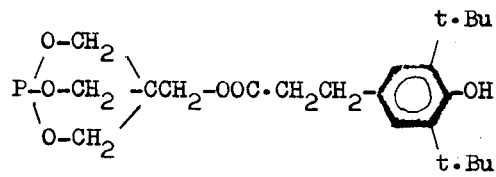

wherein t.Bu represents tertiary butyl radical.

Steric hindered phenols as mentioned above may be used solely or as a mixture of these as one of combined stabilizer-components.

Although among these steric hindered phenols low molecular steric hindered phenols such as 2,6-di-tertiary-butyl-4-methyl-phenol per se is also effective as stabilizer, since its melting point is low and it is liable to valatilize, it volatilizes during molding process and also transfers remarkably from the molded product; in the practical use these having a large molecular weight such as those of bisphenolic or polyphenolic type or having 3,5-di-tertiary-butyl-hydroxyphenyl radical are more preferable.

The amount of steric hindered phenols to be added to polyphenylene ether resins is in a range of from 0.01 to 5%, preferably from 0.05 to 2%. When steric hindered phenols is used solely as stabilizer of polyphenylene ether resin components its stabilizing effect is not so remarkable, whereas when it is combined with high molecular phosphorous ester as mentioned above a quite excellent thermal stabilizing effect can be attained.

For the purpose of further improving of the said stabilizer consisting of a high molecular phosphorous ester and steric hindered phenols so as to obtain a more higher thermal stability of polyphenylene ether resins for long period of use there is considered a combination with dicarboxylic acid dihydrazide substitution product as third component. Then, it was found that a stabilizer of the ternary system consisting of a high molecular phosphorous ester, steric hindered phenol and dicarboxylic acid dihydrazide substitution product shows extremely excellent stabilizing effects on polyphenylene ether type resins. This ternary combination not only contributes in improvement of thermal stabilizing effect under a maintained elevated temperature such as during the molding process but also exhibits quite excellent effects in the stabilization of said resins against a long period of thermal and oxidative action at a practical operating temperature of above 100°C. This ternary thermal stabilizer demonstrates not only an outstanding thermal stabilizing effect compared with that of each individual stabilizing component, but also the whole amount of stabilizers to be added to resins may be reduced and according to the minimum amount of the addition of the stabilizers may perform the said purpose without degrading the original physical properties of the said resins.

Dicarboxylic acid dihydrazide substitution products to be used in this stabilizing composition are those in which the terminal hydrogen atoms of dicarboxylic acid dihydrazide are substituted and may be represented by the aforementioned general formula (II).

Dicarboxylic acid dihydrazide substitution products used herein are quite the same with those explained in the aforementioned composition consisting of dicarboxylic acid dihydrazide disubstitution product, phosphorous ester and polyphenylene ether resins in their chemical structures and physical properties. Accordingly examples described therein are also all applicable in this case. Also hydrazine and its substitution products or dicarboxylic acid dihydrazide are not included herein. The amount of dicarboxylic acid dihydrazide substitution product to be added is in the range of from 0.01 – 10%, preferably from 0.05 to 5% of polyphenylene ether resin component and there is no special limitation in compounding process. For example, the stabilizer per se may be mixed with resin powder or by mixing with a solvent which dissolves both or one of these and then mixed with resin followed by evaporation.

The stabilized polyphenylene ether resin composition stated herein may further contain ultravioletabsorbing agent, metallic soap, pigments, dyes, plasticizers, flame, retarder and so on.

According to this composition remarkably stabilized polyphenylene ether composition against thermal and oxidative action in an extremely wide range of temperature can be attained. This composition according to the invention provides polyphenylene ether resin composition to be molded and being stabilized against thermal and oxidative action for a long period without degrading melt-flow characteristics, appearance such as coloring or grossy appearance, mechanical, electrical, chemical and thermal properties of polyphenylene ether resins. Thus resin composition as mentioned above are extremely useful in industrial field.

The present invention is illustrated further by the following examples which, however, are not to be taken as limiting in any respect. All parts and percentages, unless expressly stated to be otherwise, are by weight.

Examples 1 – 9 and Comparative Examples 1 – 3

To a mixture of 50 parts of poly(2,6-dimethyl-1,4-phenylene ether) having intrinsic viscosity of 0.56 dl/g (in chloroform at 25°C), 43.5 parts of polystyrene (Dialex HT-190, produced by Mitsubishi-Monsant Chemical Company), 2.5 parts of polycarbonate (Iupilon E- 2000 produced by Mitsubishi Gas Chemical Company, Inc.) and 4.0 parts of polystyrene-polybutadiene-rubber containing polybutadiene/polystyrenes = 40/60 are added 2.0 parts of triphenyl phosphate and 3.0 parts of titanium oxide and the obtained mixture is throughly mixed in Henschel Mixer. To aliquits of this mixture the thermal stabilizers are each added in their appointed amounts as shown in Table 1. After drying at 80°C over a whole day and night the mixture thus obtained is treated with ZSK-twin screw extruder manufactured by Werner & Pfleiderer Corp. at a temperature of 240° – 290°C to form pellets, which are then treated with injection molding at a temperature of 260° – 280°C and injection pressure of 1400 kg/cm² to form test pieces. Heat aging test is carried out in a hot air-circulating oven at 120°C for 100 hours. For Izod impact test ⅛ inch thickness of notched test pieces are used. Melt-flow value is determined by the use of Shimazu-Koka Type Flow tester under the conditions of at the temperature of 230°C and load of 60 kg.

Molding characteristics, appearance of the molded products and appearance and some physical peoperties of the molded products are shown in Table 1.

High molecular phosphorous esters (A), (B), (D), (E), (F) and (G) represented by the general formula

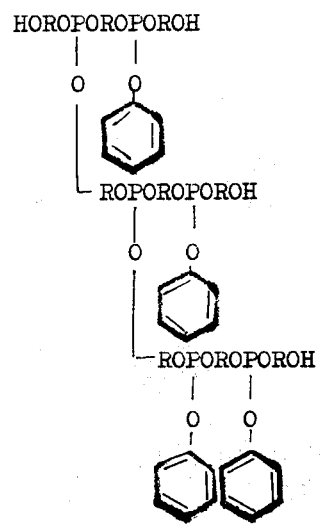

wherein R represents

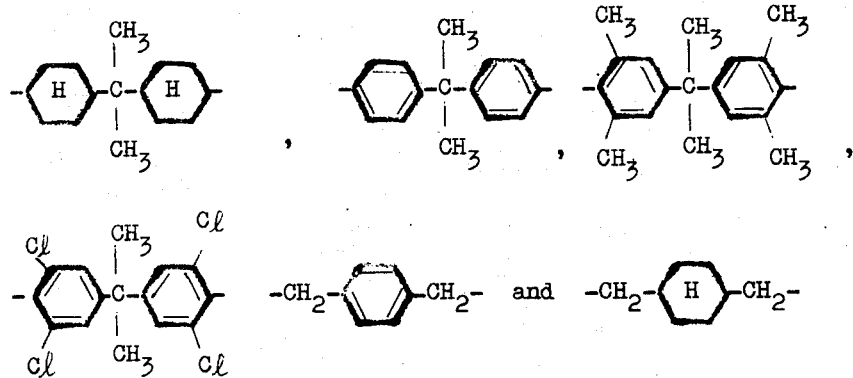

respectively for (A), (B), (D), (E), (F) and (G), wherein the molecular weight of these phosphorous esters are in the range of from 2400 to 3000.

High molecular phosphorous ester (C) is represented by the formula

P(OCH₂)₃CCH₂OCH₂CCH₂OCH₂C(CH₂O)₃P

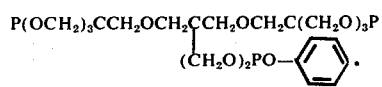

Table 1

| | Stabilizer | | Molding characteristics | | Appearance of the molded product | Appearance of the molded product after heat aging | Residual ratio of various mechanical properties after heat aging (%) | | | |
|---|---|---|---|---|---|---|---|---|---|---|
| | Type | Added amount (PHR) | | Melt-flow value (CC/min) | | | Whiteness | Izod impact strength | Tensile impact strength | Tensile elongation |
| Example 1 | High molecular phosphorous ester (A) | 0.3 | good | $2.5-3.5 \times 10^{-3}$ | glossy appearance | not discolored | 97.0 | 55.0 | 29.5 | 63.0 |
| 2 | '' | 0.5 | '' | '' | '' | '' | 98.0 | 65.0 | 45.0 | 73.0 |
| 3 | '' | 1.0 | '' | '' | '' | '' | 98.3 | 77.0 | 73.5 | 76.0 |
| 4 | High molecular phosphorous ester (B) | 1.0 | '' | '' | '' | '' | 97.8 | 75.0 | 70.0 | 76.0 |
| 5 | (C) | 1.0 | '' | '' | '' | '' | 98.0 | 79.5 | 68.5 | 76.0 |
| 6 | (D) | 1.0 | '' | '' | '' | '' | 97.5 | 75.0 | 60.0 | 78.0 |
| 7 | (E) | 1.0 | '' | $1.5-2.0 \times 10^{-3}$ | '' | '' | 97.5 | 70.0 | 58.0 | 65.0 |
| 8 | (F) | 1.0 | '' | '' | '' | '' | 98.0 | 70.0 | 60.0 | 70.0 |
| 9 | (G) | 1.0 | '' | '' | '' | '' | 98.0 | 68.0 | 60.0 | 70.0 |
| Comparative Example 1 | no addition | — | wrong | $1.0 \times 10^{-3}$ | lustreless appearance | discolored | 93.8 | 43.0 | 26.0 | 13.0 |
| 2 | Triphenyl phosphite | 0.7 | '' | '' | '' | '' | 96.0 | 61.0 | 50.0 | 68.0 |
| 3 | Tricresyl phosphite | 1.0 | '' | '' | '' | '' | 96.0 | 59.0 | 55.6 | 76.0 |

Examples 10 – 14 and Comparative Examples 4 and 5

To a mixture of 50 parts of poly(2,6-dimethyl-1,4-phenylene ether having intrinsic viscosity of 0.55 dl/g (in chloroform, at 25°C), 47.5 parts of polystyrene (Dialex HT-91, produced by Mitsubishi Monsant Chemical Company) and 2.5 parts of polycarbonate (Iupilon E-2000, produced by Mitsubishi Gas Chemical Company, Inc.) are added 2.0 parts of triphenyl phosphate, 2.0 parts of titanium oxide and 1.5 parts of flame retarding agent as additives and the obtained mixture is throughly mixed homogeneously and is added with each thermal stabilizer as shown in Table 2 respectively. Then, obtained mixtures are each further treated as described in Example 1. High molecular phosphorous esters (A), (B) and (C) in Table 2 are the same with those described in Table 1. Examples 1 – 7 B and Comparative Examples 1 – 5 B Table 2

| | Stabilizer | | Molding characteristic | Appearance of molded product | Appearance of molded product after heat aging | Residual ratio of various mechanical properties after heat aging (%) | | | |
|---|---|---|---|---|---|---|---|---|---|
| | Type | Added amount (PHR) | | | | Whiteness | Izod impact strength | Tensile impact strength | Tensile elongation |
| Example 10 | High molecular phosphorous ester (A) | 0.5 | good | glossy appearance | not discolored | 97.5 | 88.1 | 76.3 | 65 |
| | $B_2O_3$ | 0.2 | | | | | | | |
| 11 | High molecular phosphorous ester (A) | 1.0 | '' | '' | '' | 97.8 | 75.0 | 75.0 | 68 |
| | $B_2O_3$ | 0.2 | | | | | | | |
| 12 | High molecular phosphorous ester (B) | 0.5 | '' | '' | '' | 97.5 | 76.0 | 75.0 | 67 |
| | $B_2O_3$ | 0.2 | | | | | | | |
| 13 | High molecular phosphorous ester (C) | 0.5 | '' | '' | '' | 97.5 | 80.2 | 82.9 | 70 |
| | $B_2O_3$ | 0.2 | | | | | | | |
| 14 | High molecular phosphorous ester (C) | 1.0 | '' | '' | '' | 97.8 | 83.0 | 83.0 | 70 |
| | $B_2O_3$ | 0.2 | | | | | | | |
| Comparative Example 4 | not added | — | wrong | lustreless appearance | discolored | 93.4 | 42.0 | 24.5 | 11.5 |
| 5 | $B_2O_3$ | 0.2 | '' | '' | '' | 94.9 | 42.0 | 24.0 | 10.5 |
| Reference | High molecular phosphorous ester (A) | 0.5 | good | glossy appearance | not discolored | 98.0 | 65.0 | 58.0 | 70.0 |

Table 3

| Comparative Example | Stabilizer | Amount to be added (PHR) | Residual ratio of physical properties in percentage after maintained at 280°C for 45 minutes in the cylinder of injection molding machine | | | |
|---|---|---|---|---|---|---|
| | | | Izod impact strength | Tensile impact strength | Tensile elongation | Whiteness |
| 6 | not added | — | 42.6 | 74.0 | 85.0 | 40 |
| 7 | Apidic acid bisacetylhydrazide | 0.7 | 48.0 | 75.0 | 66.0 | 77 |
| 8 | Triphenyl phosphite | 0.7 | 65.0 | 85.0 | 66.0 | 24 |
| 9 | High molecular phosphorous ester (A) | 1.0 | 67.5 | 88.0 | 70.0 | 70 |
| 10 | High molecular phosphorous ester (B) | 1.0 | 67.0 | 86.5 | 70.5 | 70 |
| Example 15 | Adipic acid-bisacetylphosphite | 0.1 | 79.5 | 90.1 | 80.5 | 90 |
| | High molecular phosphorous ester (A) | 0.6 | | | | |
| 16 | Adipic acid-bis-acetylhydrazide | 0.15 | 82.1 | 93.0 | 85.0 | 96 |
| | High molecular phosphorous ester (B) | 0.75 | | | | |
| 17 | Terephthalic acid-bis-acetyhydrazide | 0.1 | 81.2 | 88.0 | 78.0 | 85 |
| | High molecular phosphorous ester (A) | 0.6 | | | | |
| 18 | Terephthalic acid-bis-phenylhydrazide | 0.1 | 80.5 | 83.0 | 75.0 | 91 |
| | High molecular phosphorous ester (C) | 0.6 | | | | |
| 19 | Adipic acid-bis-acetylhydrazide | 0.2 | 82.5 | 85.0 | 80.5 | 93 |
| | High molecular phosphorous ester (D) | 0.5 | | | | |
| 20 | Terephthalic acid-bis-acetylhydrazide | 0.15 | 84.0 | 87.0 | 83.0 | 94 |
| | High molecular phosphorous ester (A) | 0.4 | | | | |
| | Boron oxide | 0.15 | | | | |

| Molding characteristic after maintaining at 280°C for 45 minutes | Appearance of molded products after thermal aging |
|---|---|
| wrong | colored |
| good | somewhat colored |
| wrong melt flow | somewhat colored |
| good | not colored |
| " | " |
| " | " |
| " | " |
| " | " |
| " | " |
| " | " |

Examples 22 – 23 and Comparative Examples 11 – 12

Compositions are obtained in the manner described in Example 15 with the exception that the stabilizers described in Table 4 are used. The obtained compositions are extruded with an extruder to form pellets and then test pieces are prepared by injection molding of obtained pellets at a temperature of 260° – 280°C and 1400 kg/cm² in an injection molding machine.

Another test pieces are also prepared by injection molding of said composition after maintaining at 280°C for 45 minutes in the cylinder of the said molding machine.

Some mechanical properties of the test pieces of each group are measured. The results are shown in Table 4. Residual Ratio of physical properties in percentage after maintaining at 280°C for 15 minutes in the cylinder of the injection molding machine in Table 4 in the value of the physical properties of the test pieces obtained by molding after maintaining at 280°C for 45 minutes in the cylinder of said molding machine divided by the value of the physical properties of the test pieces obtained by an ordinary injection molding and then multiplied by 100 and this represents the degree of the thermal stability.

Table 4

| | Stabilizer | | Residual ratio of physical properties after maintaining at 280°C for 45 minutes in the cylinder of injection molding machine | | | | Appearance of molded product after maintaining at 280°C for 45 minutes |
|---|---|---|---|---|---|---|---|
| | Type | Amount (PHR) | Izod impact strength | Tensile impact strength | Tensile elongation | Whiteness | |
| Comparative Example 11 | Adipic acid-bis-acetyl hydrazide | 0.7 | 34.3 | 54.5 | 64.1 | 80 | Discolored extremely |
| 12 | Triphenyl phosphite | 0.7 | 55.0 | 55.6 | 70.5 | 60 | Luster is extremely wrong not colored |
| Example 21 | Adipic acid-bis-acetylhydrazide | 0.2 | 69.8 | 70.5 | 92.5 | 98.5 | glossy appearance |
| | High molecular phosphorous ester (A) | 0.5 | | | | | |

Examples 15 – 20 and Comparative Examples 6 – 10

To 50 parts of poly(2,6-dimethyl-1,4-phenylene ether) having intrinsic viscosity of 0.55 dl/g (in chloroform at 25°C), 41 parts of impact resistant polystyrene (Estyrene H-65; produced by Nippon Steel Chemical Co.), 4 parts of polystyrene-butadiene rubber containing polybutadiene/polystyrene (in the ratio of 40/60 by weight) and 5 parts of polycarbonate (Iupilon E-2000; produced by Mitsubishi Gas Chemical Company, Inc.) are added 7 parts of titanium oxide, 5 parts of triphenyl phosphate, 0.5 parts of ultraviolet absorbent and an appointed amount in Table of thermal stabilizer in a form of solution or suspension and mixed in Henschel Mixer under drying. The obtained composition is extruded in an extruder to form pellets and then treated with injection molding at a temperature of 260° – 280°C and 1400 kg/cm² to form test pieces.

Another test pieces were also prepared by injection molding of the composition as said above after holding this at 280°C for 45 minutes in the cylinder of the injector.

Some mechanical properties of the test pieces of each group were measured. Izod impact strength was measured with notched-test pieces having thickness of ⅛ inch and also brightness was measured according to JIS Z 8741. The results are shown in Table 3. Residual Ratio of physical properties after maintaining at 280°C for 45 minutes in the cylinder of the injection molding machine in Table 3 is the value of the physical properties of the test pieces obtained by molding after maintaining this at 280°C for 45 minutes in the cylinder of injection molding machine divided by the value of the physical properties of the test pieces obtained by an ordinary injection molding process and then multiplied by 100 and represents the degree of thermal stability.

High molecular phosphorous esters (A), (B) and (D) used in Table 3 (also in Tables 4 and 5 hereinafter) are represented by the formula

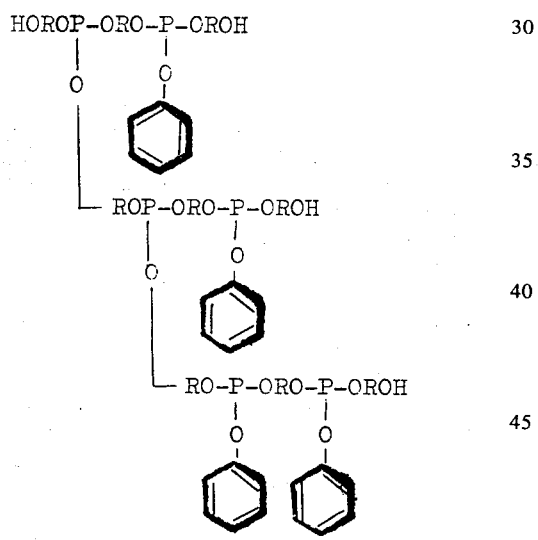

wherein R in the esters (A), (B) and (D) represents

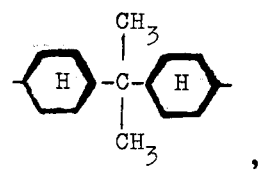

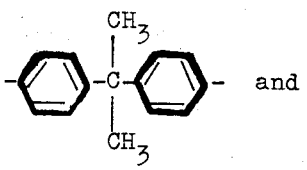
and

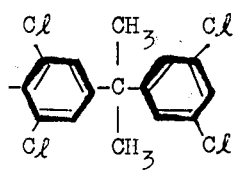

respectively. High molecular phosphorous ester (C) is represented by the formula

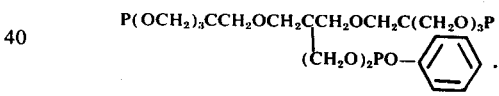

Examples 22–27 and Comparative Examples 13 – 17.

Compositions are obtained in the manner described in Example 15 with the exception that the stabilizers described in Table 5 are used. The obtained composi- Table 5

| | Stabilizer | | Residual ratio of physical properties of molded products after aging (%) | | | | |
|---|---|---|---|---|---|---|---|
| | Type | Amount to be added (PHR) | Izod impact strength | Tensile impact strength | Tensile elongation | Whiteness | Appearance of molded products after aging |
| Comparative Example 13 | not added | — | 43.0 | 26.0 | 13.0 | 93.8 | discolored |
| 14 | Adipic acid-bisacetyl-hydrazide | 0.7 | 70.0 | 66.0 | 70.0 | 95.0 | somewhat discolored |
| 15 | Triphenyl phosphite | 0.7 | 61.0 | 50.0 | 68.0 | 96.0 | somewhat discolored |
| 16 | High molecular phosphorous ester (A) | 1.0 | 73.1 | 65.0 | 75.0 | 98.3 | not discolored |
| 17 | " (B) | 1.0 | 70.0 | 66.3 | 72.1 | 98.0 | " |
| Example 22 | Adipic acid-bisacetyl-hydrazide | 0.1 | | | | | |
| | High molecular phosphorous ester (A) | 0.6 | 81.7 | 80.5 | 77.0 | 98.5 | " |
| 23 | Adipic acid bis-acetylhydrazide | 0.15 | | | | | |
| | High molecular phosphorous ester (B) | 0.75 | 83.5 | 81.0 | 81.0 | 98.9 | " |

Table 5 -continued

| | Stabilizer | | Residual ratio of physical properties of molded products after aging (%) | | | | |
|---|---|---|---|---|---|---|---|
| | Type | Amount to be added (PHR) | Izod impact strength | Tensile impact strength | Tensile elonga- tion | White- ness | Appearance of molded products after aging |
| 24 | Terephthalic acid-bis-acetyl-hydrazide | 0.1 | | | | | |
| | High molecular phosphorous ester (A) | 0.6 | 80.5 | 80.6 | 78.0 | 98.5 | " |
| 25 | Terephthalic acid-bis-phenylhydrazide | 0.1 | | | | | |
| | High molecular phosphorous ester (C) | 0.6 | 80.0 | 80.4 | 79.0 | 98.5 | " |
| 26 | Adipic acid-bis-acetyl-hydrazide | 0.2 | | | | | |
| | High molecular phosphorous ester (D) | 0.5 | 80.1 | 75.5 | 78.0 | 98.1 | " |
| 27 | Terephthalic acid-bis-acetyl-hydrazide | 0.15 | | | | | |
| | High molecular phosphorous ester (A) | 0.4 | 82.0 | 76.0 | 80.5 | 98.9 | " |
| | Boron oxide | 0.15 | | | | | | tions are extruded with an extruder to form pellets and then test pieces are prepared by injection molding of the obtained pellets at a temperature of 260° – 280°C and at 1400 kg/cm² in an injection molding machine. After aging in a hot air-circulating oven at 120°C for 100 hours physical properties of the test pieces are measured.

The results are shown in Table 5. The residual ratio of physical properties in percentage after the thermal aging test ahown in Table 5 is the values in which the value of the physical properties of the test pieces after said aging test derived by the value of the physical properties of the test pieces before aging and then multiplied by 100 and this shows the degree of thermal stability.

Examples 28 – 35 and Comparative Examples 18 – 20

To a mixture of 50 parts of poly(2,6-dimethyl-1,4-phenylene ether) having intrinsic viscosity of 0.56 dl/g (in chloroform at 25°C), 41 parts of impact resistant polystyrene (Estyrene H-65; produced by Nippon Steel Chemical Co.), 4 parts of polystyrene-polybutadiene-rubber containing polybutadiene/polystyrene = 40/60 by weight and 5 parts of polycarbonate (Iupilon E-2000; produced by Mitsubishi Gas Chemical Company, Inc.) are added 2.0 parts of triphenyl phosphate and 3.0 parts of titanium oxide and the mixture is throughly mixed in Henschel Mixer. To an aliquots of the obtained mixture are added thermal stabilizers each in their appointed amount as shown in Table 6. After drying at 80°C over a whole day and night the mixtures thus added are each extruded with ZSK-twin screw extruder manufactured by Werner & Pfeiderer Corp. at a temperature of 240° – 290°C to form pellets, which are then treated with injection molding at a temperature of 260° – 280°C and injection pressure of 1400 kg/cm². Heat aging was carried out in a hot air-circulating oven at 120°C for 100 hours. Izod-impact Strength was measured with notched test pieces having thickness of ⅛ inch. Melt-flow value was measured with Shimazu-Koka-type Flow-tester at 230°C and 60 kg of loading.

Molding characteristics, appearance of the molded products and the residual ratio of various mechanical properties after thermal aging are shown in Table 6. The maintenance value of some physical properties after thermal aging are the value obtained by dividing the value of the physical properties after thermal aging by the value of the corresponding physical properties before aging (after molding) and then multiplied by 100.

High molecular phosphorous esters (A), (B), (D), (E), (F) and (G) described in Tables 6 – 8 are represented by the general formula

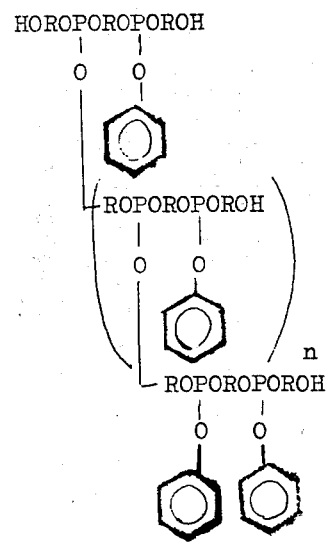

(molecular weight 2400–3400)
wherein R of (A),(B), (D), (E), (F) and (G) are represented respectively by

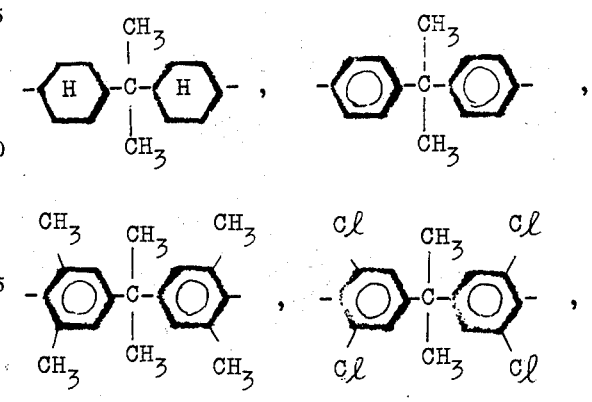

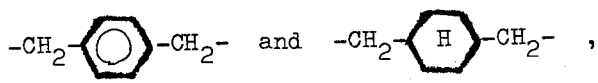

High molecular phosphorous ester (C) described in Tables 6 and 7 is represented by the formula

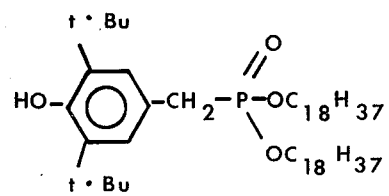

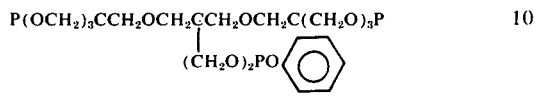

Steric hindered phenols (A), (B), (C) and (D) in Tables 6 – 8 are represented respectively by the formulae

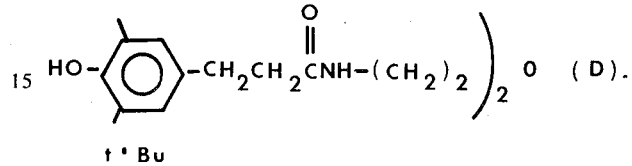

Table 6

|  | Stabilizer | Stabilizer Added amount (PHR) | Melt-flow value (CC/min) | Appearance of the products | Residual ratio of various physical properties after thermal aging at 100°C (%) | | | |
|---|---|---|---|---|---|---|---|---|
|  |  |  |  |  | White- ness | Izod impact strength | Tensile impact strength | Tensile elonga- tion |
| Example 28 | High molecular phosphorous ester (A) | 0.3 | good | 3.0×10⁻³ | glossy appearance | 98.0 | 78.0 | 70.0 | 65.0 |
|  | Steric hindered phenol (A) | 0.7 |  |  |  |  |  |  |  |
| 29 | High molecular phosphorous ester (A) | 0.5 | " | " | " | 98.0 | 79.5 | 66.0 | 69.0 |
|  | Steric hindered phenol (A) | 0.5 |  |  |  |  |  |  |  |
| 30 | High molecular phosphorous ester (A) | 0.5 | " | " | " | 98.0 | 77.0 | 75.0 | 75.0 |
|  | Steric hindered phenol (B) | 0.5 |  |  |  |  |  |  |  |
| 31 | High molecular phosphorous ester (A) | 0.5 | " | " | " | 98.0 | 80.0 | 72.5 | 78.2 |
|  | Steric hindered phenol (C) | 0.5 |  |  |  |  |  |  |  |
| 32 | High molecular phosphorous ester (A) | 0.5 | " | " | " | 98.0 | 75.0 | 72.0 | 68.0 |
|  | Steric hindered phenol (D) | 0.5 |  |  |  |  |  |  |  |
| 33 | High molecular phosphorous ester (B) | 0.5 | " | " | " | 98.0 | 76.0 | 77.0 | 75.0 |
|  | Steric hindered phenol (D) | 0.5 |  |  |  |  |  |  |  |
| 34 | High molecular phosphorous ester (C) | 0.5 | " | " | " | 98.0 | 78.0 | 78.0 | 72.0 |
|  | Steric hindered phenol (D) | 0.5 |  |  |  |  |  |  |  |
| 35 | High molecular phosphorous ester (D) | 0.5 | " | " | " | 98.0 | 75.0 | 75.0 | 71.0 |
|  | Steric hindered phenol (D) | 0.5 |  |  |  |  |  |  |  |
| Comparative Example 18 | not added | — | wrong | 1.0×10⁻³ | lustreless appearance | 93.8 | 43.0 | 26.8 | 13.3 |
| 19 | High molecular phosphorous ester (E) | 1.0 | good | 1.8×10⁻³ | glossy appearance | 97.5 | 70.0 | 58.0 | 65.0 |
| 20 | Steric hindered phenol (A) | 1.0 | some- what good | 1.8×10⁻³ | " | 98.0 | 50.8 | 38.8 | 11.1 |

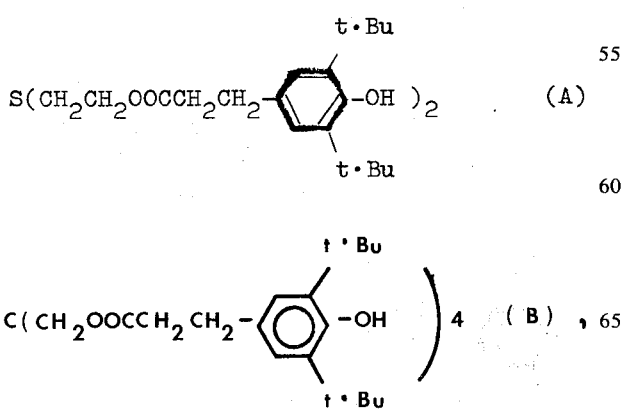

Examples 36 – 45 and Comparative Examples 21 – 24

To a mixture of 50 parts of poly(2,6-dimethyl-1,4-phenylene ether) having intrinsic viscosity of 0.57 dl/g (in chloroform at 25°C), 43.5 parts of polystyrene (Dialex HT 190, produced by Mitsubishi Monsant Chemical Company), 2.5 parts of polycarbonate (Iupilon E-2000; produced by Mitsubishi Gas Chemical Company, Inc.) and 4.0 parts of polystyrene-polybutadiene-rubber containing polybutadiene/polystyrene = 40/60 by weight are added 2.0 parts of triphenyl phosphate and 4.0 parts of titanium oxide as additive and the mixture is thoroughly mixed in Henschel-Mixer. To each portion of the mixture are added thermal stabilizer each in an appointed amount as shown in Table 7 and test pieces are prepared as described in Example 31. Initial values of physical properties of test pieces obtained without addition of thermal stabilizers was 17.4 kg cm/cm of Izod impact strength, 140 kg cm/cm² of tensile impact strength, 635 kg/cm² of tensile strength and 33.5% of tensile elongation. Values of each initial physical properties of the test pieces obtained by the addition of each stabilizer did not show any substantial difference with those not added.

After thermal aging at 120°C for 100 and 200 hours respectively as stated in Example 31 physical properties of each test pieces are measured and the residual ratio of the physical properties thereof are obtained. Molding characteristics and residual ratio of physical properties after aging are shown in Table 7.

Steric hindered phenols (E), (F) and (G) are represented by the formulae (E), (F) and (G)

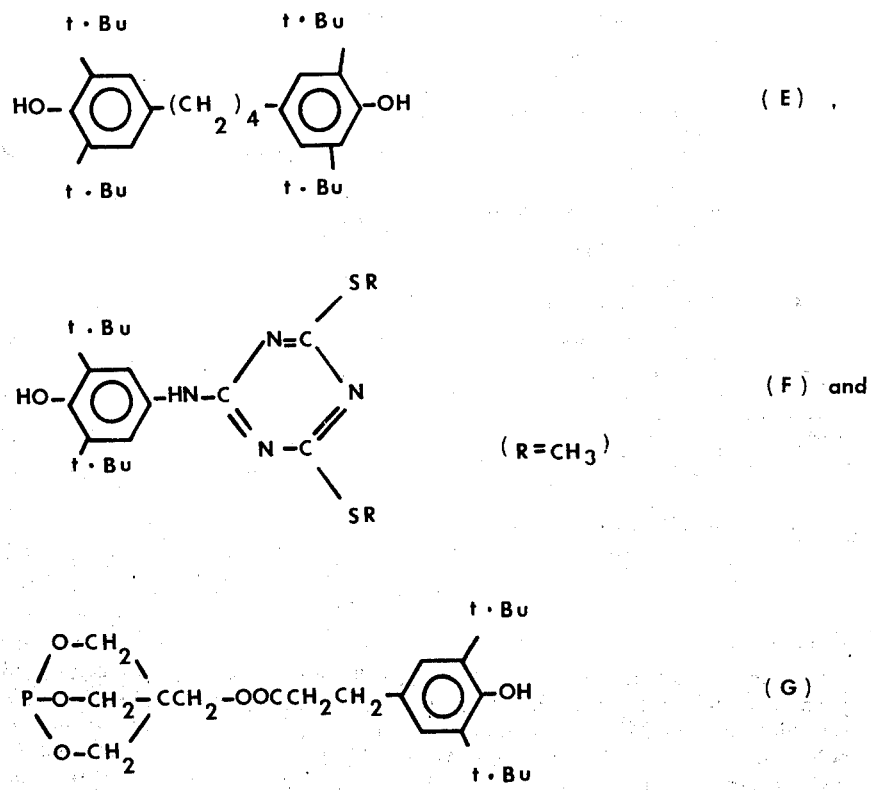

Table 7

| Example | Stabilizer | Amount to be added (PHR) | Molding characteristic | Residual ratio of Izod impact strength (%) | | Residual ratio of Tensile impact strength (%) | | Residual ratio of Tensile elongation (%) | |
|---|---|---|---|---|---|---|---|---|---|
| | | | | 100 hrs | 200 hrs | 100 hrs | 200 hrs | 100 hrs | 200 hrs |
| 36 | High molecular phosphorous ester (A) | 0.2 | very good | 84.9 | 72.5 | 90.2 | 81.2 | 65.0 | 66.5 |
| | Steric hindered phenol (A) | 0.6 | | | | | | | |
| | Adipic acid-bis-phenyl hydrazide | 0.2 | | | | | | | |
| 37 | " | 0.4 | " | 82.5 | 70.0 | 89.0 | 77.1 | 69.0 | 63.0 |
| | | 0.4 | | | | | | | |
| | | 0.2 | | | | | | | |
| 38 | High molecular phosphorous ester (B) | 0.6 | " | 79.0 | 65.0 | 85.9 | 75.2 | 70.0 | 60.0 |
| | Steric hindered phenol (A) | 0.2 | | | | | | | |
| | Adipic acid-bis-phenyl hydrazide | 0.2 | | | | | | | |
| 39 | High molecular phosphorous ester (C) | 0.4 | " | 78.5 | 68.3 | 79.0 | 65.5 | 80.5 | 67.3 |
| | Steric hindered phenol (B) | 0.4 | | | | | | | |
| | Sebacic acid bisacetyl hydrazide | 0.2 | | | | | | | |

Table 7 -continued

| Example | Stabilizer | Amount to be added (PHR) | Molding characteristic | Residual ratio of Izod impact strength (%) 100 hrs | 200 hrs | Residual ratio of Tensile impact strength (%) 100 hrs | 200 hrs | Residual ratio of Tensile elongation (%) 100 hrs | 200 hrs |
|---|---|---|---|---|---|---|---|---|---|
| 40 | High molecular phosphorous ester (D) | 0.4 | | | | | | | |
| | Steric hindered phenol (D) | 0.4 | " | 75.0 | 67.0 | 83.5 | 70.0 | 87.7 | 75.0 |
| | Adipic acid-bis-acetyl hydrazide | 0.2 | | | | | | | |
| 41 | High molecular phosphorous ester (A) | 0.4 | | | | | | | |
| | Steric hindered phenol (E) | 0.4 | " | 76.0 | 66.0 | 78.0 | 64.0 | 72.0 | 65.0 |
| | Adipic acid-bis-benzoyl-hydrazide | 0.2 | | | | | | | |
| 42 | High molecular phosphorous ester (A) | 0.4 | | | | | | | |
| | Steric hindered phenol (C) | 0.4 | " | 80.5 | 68.0 | 82.0 | 70.0 | 75.0 | 66.5 |
| | Adipic acid-bis-acetyl hydrazide | 0.4 | | | | | | | |
| 43 | High molecular phosphorous ester (F) | 0.4 | | | | | | | |
| | Steric hindered phenol (F) | 0.4 | good | 80.0 | 70.0 | 80.0 | 71.0 | 80.5 | 75.0 |
| | Adipic acid-bis-acetylhydrazide | 0.2 | | | | | | | |
| 44 | High molecular phosphorous ester (G) | 0.4 | | | | | | | |
| | Steric hindered phenol (G) | 0.4 | " | 84.5 | 72.5 | 87.9 | 75.0 | 75.9 | 62.0 |
| | Adipic acid-bis-acetylhydrazide | 0.2 | | | | | | | |
| 45 | High molecular phosphorous ester (A) | 0.4 | | | | | | | |
| | 2.6-di-t.-butyl-4-methyl-phenol | 0.4 | " | 73.0 | 62.5 | 89.0 | 70.0 | 83.0 | 79.0 |
| | Terephthalic acid-bis-acetylhydrazide | 0.2 | | | | | | | |
| Comparative Example 21 | not added | — | wrong | 45.8 | 31.6 | 25.5 | 15.2 | 12.9 | 8.5 |
| 22 | High molecular phosphorous ester (B) | 1.0 | good | 75.0 | 59.8 | 70.0 | 51.0 | 76.0 | 60.5 |
| 23 | Adipic acid-bis-benzoyl hydrazide | 1.0 | " | 65.3 | 55.5 | 62.5 | 42.0 | 76.6 | 51.0 |
| 24 | Steric hindered phenol (B) | 1.0 | somewhat good | 71.2 | 44.6 | 71.5 | 40.6 | 67.1 | 25.4 |

Examples 46 – 49 and Comparative Examples 25 – 27

To a mixture of 50 parts of poly(2,6-dimethyl-1,4-phenylene ether) having intrinsic viscosity of 0.56 dl/g (in chloroform at 25°C), 41 parts of impact resistant polystyrene (Styron; produced by Asahi-Dow Limited), 4 parts of polystrene-polybutadiene-rubber containing polybutadiene/polystyrene=40/60 by weight, 5 parts of polycarbonate (Iupilon; produced by Mitsubishi Gas Chemical Company, Inc.), 1.0 part of α-olefin-copolymer, 7 parts of titanium oxide, 5 parts of triphenyl phosphate and 0.3 parts of ultraviolet rays absorbing agent are added thermal stabilizing agents as shown in Table 3 as a solution of suspension in acetone and the mixture is thoroughly mixed in Henschel Mixer under drying. The obtained compositions are each extruded to form pellets and then treated with injection molding to result test pieces. Initial values of the physical properties of the test pieces obtained without addition of thermal stabilizer are 14.5 kg cm/cm of Izod impact strength, 120.5 kg. cm/cm$^2$ of tensile impact strength, 585.0 kg/cm$^2$ of tensile strength, 35.0% of tensile elongation and 133°C of heat distortion temperature (4 kg/cm$^2$, after anneal) and also the initial values of physical properties of test pieces obtained by the addition of stabilizers did not show any substantial difference with these values of those not added as stated above.

After thermal aging at 120°C for 100, 200 and 400 hours respectively as stated in Example 31 physical properties of each test pieces were measured and the residual ratio values of the physical properties after aging are obtained. Molding characteristics and residual ratio of physical properties after aging are shown in Table 8.

As clear from Table 3, among those suffered a long period of heat history, the residual ratio of physical properties of those of ternary system were especially superior and also degradation by thermal oxidation is very few in the case of ternary system even if the amount of stabilizers to be added were reduced.

Table 8

| Example | Stabilizer | Amount to be added (PHR) | Residual ratio of Izod impact (%) 100 hrs | 200 hrs | 400 hrs | Residual ratio of tensile impact (%) 100 hrs | 200 hrs | 400 hrs | Residual ratio of tensile elongation (%) 100 hrs | 200 hrs | 400 hrs | Molding characteristic |
|---|---|---|---|---|---|---|---|---|---|---|---|---|
| Example 46 | High molecular phosphorous ester (A) | 0.4 | | | | | | | | | | |
| | Steric hindered phenol (D) | 0.4 | 84.0 | 64.0 | 51.0 | 83.0 | 66.0 | 49.0 | 87.7 | 68.4 | 48.0 | Very good |
| | Adipic acid-bis-acetylhydrazide | 0.2 | | | | | | | | | | |

Table 8 -continued

| | Stabilizer | Amount to be added (PHR) | Residual ratio of Izod impact (%) | | | Residual ratio of tensile impact (%) | | | Residual ratio of tensile elongation (%) | | | Molding characteristic |
|---|---|---|---|---|---|---|---|---|---|---|---|---|
| | | | 100 hrs | 200 hrs | 400 hrs | 100 hrs | 200 hrs | 400 hrs | 100 hrs | 200 hrs | 400 hrs | |
| 47 | | 0.35 0.20 0.15 | 83.8 | 62.0 | 48.0 | 85.0 | 75.0 | 45.0 | 80.5 | 62.5 | 50.0 | " |
| 48 | High molecular phosphorous ester (A) | 0.4 | | | | | | | | | | |
| | Steric hindered phenol (A) | 0.4 | 86.0 | 68.0 | 49.0 | 83.0 | 60.0 | 40.0 | 78.0 | 73.0 | 55.0 | " |
| | Adipic acid-bis-acetylhydrazide | 0.2 | | | | | | | | | | |
| 49 | High molecular phosphorous ester (A) | 0.25 | | | | | | | | | | |
| | Steric hindered phenol (A) | 0.35 | 82.5 | 65.2 | 48.0 | 83.2 | 59.0 | 40.0 | 80.0 | 78.6 | 59.0 | " |
| | Adipic acid-bis-acetylhydrazide | 0.10 | | | | | | | | | | |
| Comparative Example 25 | High molecular phosphorous ester (A) | 0.75 | 78.0 | 54.5 | 40.0 | 78.5 | 35.8 | 28.0 | 80.0 | 67.7 | 40.0 | good |
| | Adipic acid-bis-acetylhydrazide | 0.15 | | | | | | | | | | |
| Comparative Example 26 | Adipic acid-bis-benzoylhydrazide | 0.7 | 80.0 | 55.8 | 38.5 | 75.0 | 42.5 | 25.0 | 76.1 | 53.0 | 38.8 | good |
| 27 | High molecular phosphorous ester (A) | 0.7 | 70.0 | 50.0 | 38.5 | 58.0 | 35.0 | 28.2 | 72.5 | 50.0 | 38.0 | |

What is claimed is:

1. Stabilized polyphenylene ether type resin composition containing
   1. stabilizer and
   2. (i) a homopolymer or copolymer having polymeric segments consisting of more than 50 of recurring structural units, represented by the formula

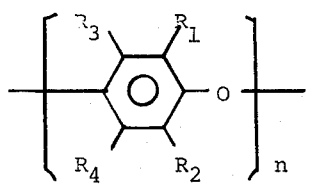

wherein $R_1$ represents a monovalent substituent selected from the group consisting of a hydrogen atom, alkyl radical, haloalkyl radical having at least two carbon atoms between the halogen atom thereof and the phenol nucleus, alkoxy radical, haloalkoxy radical having at least two carbon atoms between the halogen atom thereof and the phenol nucleus; $R_2$, $R_3$ and $R_4$ each represent a monovalent radical selected from the above-identified group or a halogen atom, wherein all of $R_1$, $R_2$, $R_3$ and $R_4$ cannot represent hydrogen atoms at the same time and said substituents cannot include an α-carbon atom as a tertiary carbon atom, and n represents an integer of more than 50;

(ii) a graft copolymer wherein alkenyl aromatic compound is grafted on said homopolymer or said copolymer; or (iii) a mixture of said homopolymer, said copolymer or said graft copolymer with other resins; characterized in that said stabilizer is a high molecular phosphorous ester which has at least three phosphorous ester-bonds per molecule and is obtained by reacting a compound selected from the group consisting of bisphenol A, hydrogenated bisphenol A, alkyl-substituted bisphenol A, halogenated bisphenol A, p-xylylene glycol, 1,4-cyclohexanedimethanol and pentaerythritol with a phosphorous ester or acid represented by the formula (I)

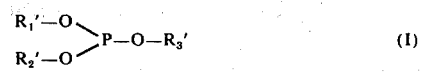

wherein $R'_1$, $R'_2$ and $R'_3$ represent each a hydrogen atom, alkyl, aryl, or haloaryl radical.

2. Stabilized polyphenylene ether type resin composition as claimed in claim 1, wherein said high molecular phosphorous esters are represented by one of the general formulae

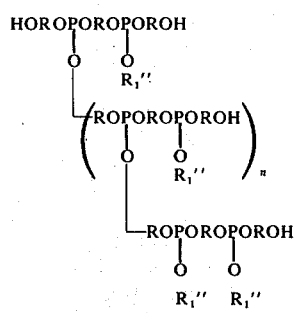

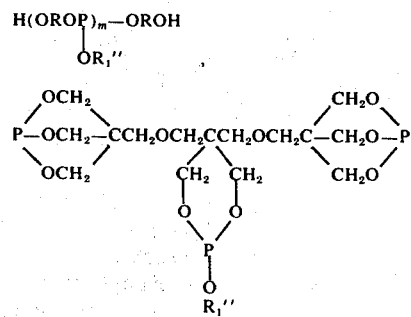

wherein R represents

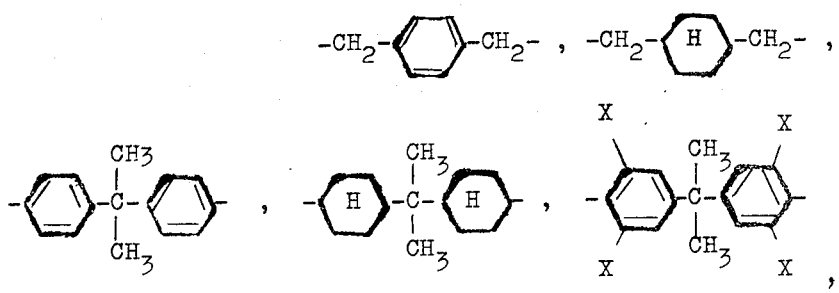

wherein X represents a halogen atom or alkyl radical; R''₁ represents an alkyl, aryl or haloaryl radical; n represents zero or a positive integer; m represents an integer of at least 3.

3. Stabilized polyphenylene ether type resin composition as claimed in claim 2, wherein R''₁ is aryl or haloaryl radical.

4. Stabilized polyphenylene-ether resin composition as claimed in claim 1, wherein the amount of said high molecular phosphorous ester is in the range of from 0.01 to 10 percent by weight of polyphenylene ether resin component.

5. Stabilized polyphenylene ether resin composition as claimed in claim 1, wherein the amount of said high molecular phosphorous ester is in the range of from 0.1 to 3 percent by weight of polyphenylene ether resin component.

6. Stabilized polyphenylene ether type resin composition containing
1. a stabilizer and
2. (i) a homopolymer or copolymer having recurring structural unit represented by the formula

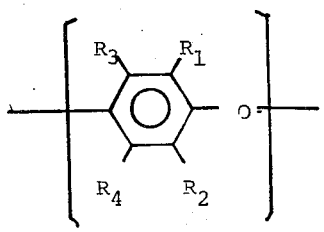

wherein $R_1$ represents a monovalent substituent selected from the group consisting of a hydrogen atom, alkyl radical, haloalkyl radical having at least two carbon atoms between the halogen atom thereof and the phenol nucleus, alkoxy radical, haloalkoxy radical having at least two carbon atoms between the halogen atom thereof and the phenol nucleus; $R_2$, $R_3$ and $R_4$ each represent a monovalent radical selected from the above-identified group or a halogen atom, wherein all of $R_1$, $R_2$, $R_3$ and $R_4$ cannot represent hydrogen atoms at the same time and said substituents cannot include an α-carbon atom as a tertiary carbon atom;

(ii) a graft copolymer wherein alkenyl aromatic compound is grafted on said homopolymer or said copolymer; or (iii) a mixture of said homopolymer, said copolymer or said graft copolymer with other resins; characterized in that the stabilizer is a. a dicarboxylic acid dihydrazide substitution product represented by the general formula II

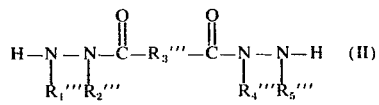

wherein $R'''_1$ and $R'''_5$ represent an alkyl, aryl, alkoxy, aryl or aroyl radical, $R'''_2$ and $R'''_4$ represent a hydrogen atom, alkyl or aryl radical and $R''''_3$ represents an alkylene or arylene radical;

b. a high molecular phosphorous ester which has at least three phosphorous eater-bonds per molecule and obtained by molding a compound selected from the group consisting of bisphenol A, hydrogenated bisphenol A, alkyl substituted bisphenol A, halogenated bisphenol A, p-xylylene glycol, 1,4-cyclohexane-dimethanol and pentaerythritol with a phosphorous ester or acid represented by the formula

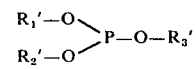

wherein $R'_1$, $R'_2$ and $R'_3$ represent each a hydrogen atom, alkyl, aryl or haloaryl radical.

7. Stabilized polyphenylene ether type resin composition as claimed in claim 6, wherein said dicarboxylic acid dihydrazide substitution product is represented by the above mentioned general formula II, wherein $R'''_1$ and $R'''_5$ represent each an alkyl radical having 1 – 20 carbon atoms, aliphatic acyl radical having 2 – 21 carbon atoms, benzoyl radical, substituted benzoyl radical, alkoxy radical having 1 – 20 carbon atoms, phenyl radical or substituted phenyl radical; $R'''_2$ and $R'''_4$ represent a hydrogen atoms, alkyl radical having 1–20 carbon atoms, phenyl radical or substituted phenyl radical; and $R'''_3$ represent an alkylene radical having 1 – 20 carbon atom, phenylene radical or substituted phenylene radical.

8. Stabilized polyphenylene ether type resin composition as claimed in claim 6, wherein said dicarboxylic acid dihydrazide substitution product is represented by the general formula II, wherein $R'''_1$ and $R'''_5$ represent each an alkyl radical having 1 – 4 carbon atoms, aliphatic acyl radical having 2 – 5 carbon atoms, benzoyl radical, substituted benzoyl radical, alkoxy radical having 1 – 4 carbon atoms, phenyl radical or substituted phenyl radical; $R'''_2$ and $R'''_4$ represent hydrogen atom, alkyl radical having 1 – 4 carbon atoms, phenyl radical or substituted phenyl radical; and $R'''_3$ represent an alkylene radical having 1 – 20 carbon atoms, phenylene radical or substituted phenylene radical.

9. Stabilized polyphenylene ether type resin composition as claimed in claim 6, wherein said dicarboxylic acid dihydrazide substitution product is represented by the general formula II, wherein $R'''_1$ and $R'''_5$ represent acetyl radical; $R'''_2$ and $R'''_4$ represent hydrogen atom; and $R'''_3$ represent an alkylene radical having 1 – 10 carbon atoms.

10. Stabilized polyphenylene ether type resin composition as claimed in claim 6, wherein said dicarboxylic acid dihydrazide is adipic acid bis-acetyl hydrazide.

11. Stabilized polyphenylene ether resin composition as claimed in claim 6, wherein said high molecular phosphorous esters are represented by one of the general formulae

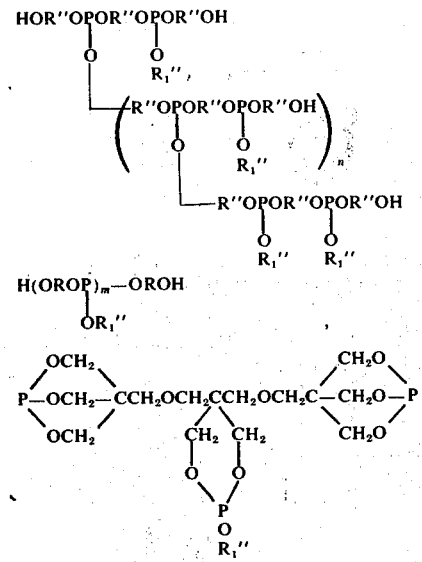

Wherein R" represents

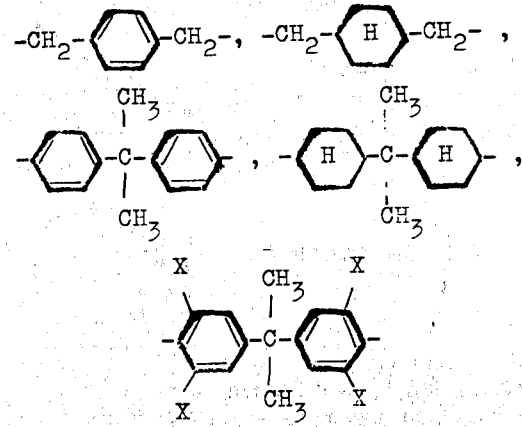

wherein X represents a halogen atom or alkyl radical, $R''_1$ represents an alkyl, aryl or haloaryl radical; n represents zero or a positive integer; m represents an integer of at least 3.

12. Stabilized polyphenylene ether type resin composition as claimed in claim 11, wherein $R''_1$ is aryl or haloaryl radical.

13. Stabilized polyphenylene ether type resin composition as claimed in claim 6 wherein the amount of said dicarboxylic acid dihydrazide substituted product is in the range of from 0.01 to 10 percent by weight of polyphenylene ether type resin component and the amount of said high molecular phosphorous ester is in the range of from 0.01 to 10 percent by weight of polyphenylene ether type resin component.

14. Stabilized polyphenylene ether type resin composition as claimed in claim 8 wherein the amount of said dicarboxylic acid dihydrazide substituted product is in the range of from 0.05 to 2.0 percent by weight of polyphenylene ether type resin component and the amount of said high molecular phosphorous ester is in the range of from 0.05 to 2.0 percent by weight of polyphenylene ether type resin component.

15. Stabilized polyphenylene ether type resin composition containing
 1. stabilizer and
 2. (i) homopolymer or copolymer having recurring structural unit represented by the formula

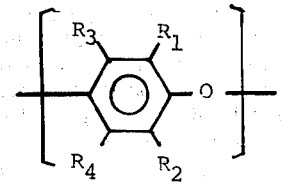

wherein $R_1$ represents a monovalent substituent selected from the group consisting of a hydrogen atom, alkyl radical, haloalkyl radical having at least two carbon atoms between the halogen atom thereof and the phenol nucleus, alkoxy radical, haloalkoxy radical having at least two carbon atoms between the halogen atom thereof and the phenol nucleus; $R_2$, $R_3$ and $R_4$ each represent a monovalent radical selected from the above-identified group or a halogen atom, wherein all of $R_1$, $R_2$, $R_3$ and $R_4$ cannot represent hydrogen atoms at the same time and said substituents cannot include an α-carbon atom as a tertiary carbon atom;

(ii) graft copolymer wherein alkenyl aromatic compound is grafted on said homopolymer or said copolymer; or (iii) mixture of said homopolymer, said copolymer or said graft copolymer with other resins; characterized in that the stabilizer is (a) a steric hindered phenol represented by the general formula (III or IV)

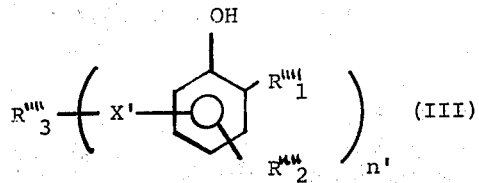

or

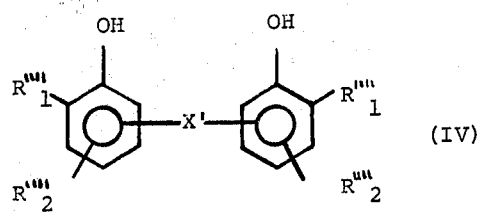

wherein
X' represents an alkylene, arylene, alkyleneoxy, aryleneoxy radical, —NH—,

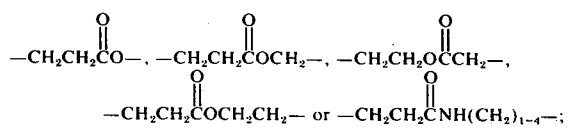

R''''₁ and R''''₂ represent alkyl radical and at least one is tert.-butyl radical; R''''₃ represents a hydrogen, oxygen, sulfur, carbon atom, an alkyl, aryl, triazino, substituted triazino,

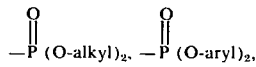

—C(alkylene-O)₃P or —C(alkylene-S₃P; and $n$ is an integer of 1 – 4, b. a high molecular phosphorous ester which has at least three phosphorous ester-bonds per molecule and is obtained by reacting a compound selected from the group consisting of bisphenol A, hydrogenated bisphenol A, alkyl-substituted bisphenol A, halogenated bisphenol A, p-xylylene glycol, 1,4-cyclohexane-dimethanol and pentaerythritol with a phosphorous ester or acid represented by the formula

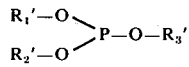

wherein R'₁, R'₂ and R'₃ represent each a hydrogen atom, alkyl, aryl or haloaryl radical.

16. Stabilized polyphenylene ether type resin composition claimed in claim 15, wherein said steric hindered phenols are represented by one of the general formulae

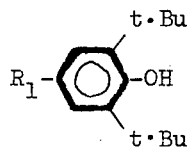

wherein R₁ represents alkyl radical having 1 – 4 carbon atom

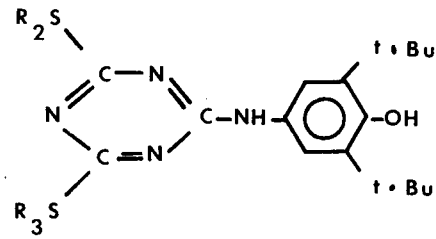

wherein R₂ and R₃ represent alkyl radical having 1 – 4 carbon atom

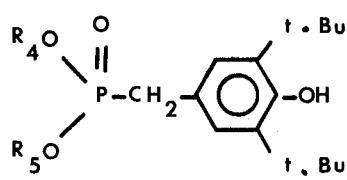

wherein R₄ and R₅ represent alkyl radical having 1 – 30 atom

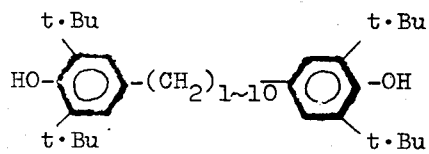

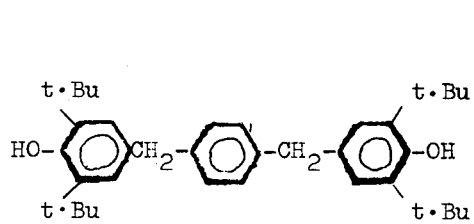

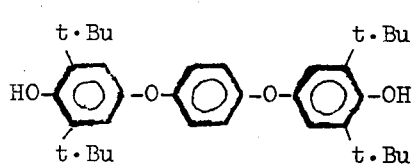

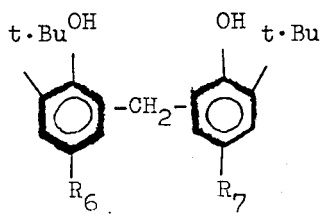

wherein R₆ and R₇ represent methyl or ethyl radical

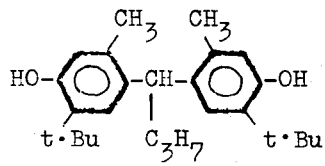

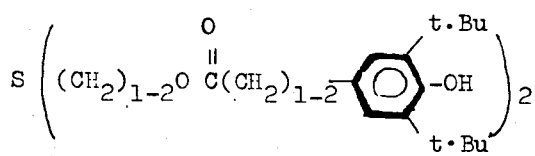

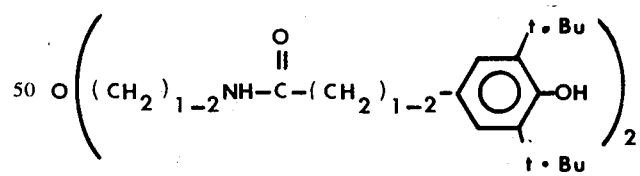

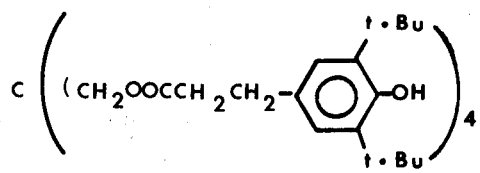

wherein Bu represents Butyl.

17. Stabilized polyphenylene ether type resin composition claimed in claim 15, wherein said steric hindered phenol is 2,6-di-tert. butyl-4-methyl phenol.

18. Stabilized polyphenylene ether type resin composition claimed in claim 15, wherein said steric hindered phenol is bis(2-hydroxy-3-tert. butyl-5-methyl)methane or bis(2-hydroxy-3-tert. butyl-5-ethyl)methane.

19. Stabilized polyphenylene ether type resin composition as claimed in claim 15, wherein said high molecular phosphorous esters are represented by one of the general formulae

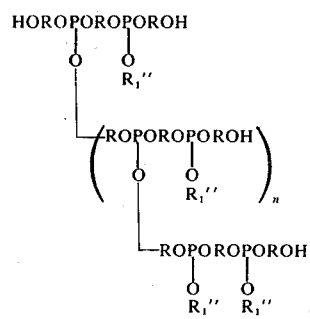

$$H(OROP)_m-OROH,$$
$$\qquad\quad|$$
$$\qquad\ \ OR_1''$$

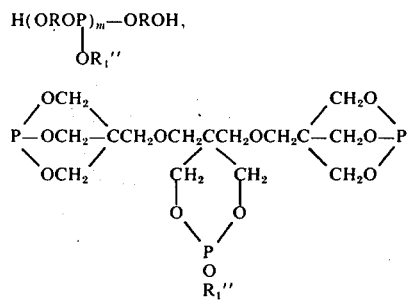

wherein R represents

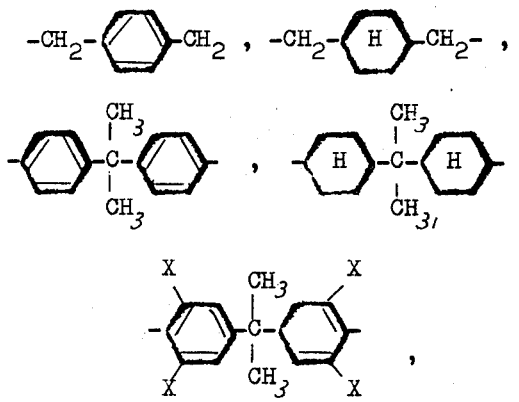

wherein
X represents a halogen atom or alkyl radical;
$R''_1$ represents an alkyl, aryl or haloaryl radical;
n represents zero or a positive integer;
m represents an integer of at least 3.

20. Stabilized polyphenylene ether type resin composition as claimed in claim 19, wherein $R''_1$ is aryl or haloaryl radical.

21. Stabilized polyphenylene ether type resin composition as claimed in claim 15 wherein the amount of said steric hindered phenol is in the range of from 0.01 to 10 percent by weight of polyphenylene ether type resin component and the amount of said high molecular phosphorous ester is in the range of from 0.01 to 10 percent by weight of polyphenylene ether type resin component.

22. Stabilized polyphenylene ether type resin composition as claimed in claim 15 wherein the amount of said steric hindered phenol is in the range of from 0.05 to 2.0 percent by weight of polyphenylene ether type resin component and the amount of said high molecular phosphorous ester is in the range of from 0.01 to 10 percent by weight of polyphenylene ether type resin component.

23. Stabilized polyphenylene ether type resin composition containing
1. stabilizer and
2. (i) homopolymer or copolymer having recurring structural unit represented by the formula $$\left[\begin{array}{c}R_3\quad R_1\\ \phantom{-}\bigcirc\phantom{-}\\ R_4\quad R_2\end{array}\ \ \!\!\!O\right]$$

wherein $R_1$ represents a monovalent substituent selected from the group consisting of a hydrogen atom, alkyl radical, haloalkyl radical having at least two carbon atoms between the halogen atom thereof and the phenol nucleus, alkoxy radical, haloalkoxy radical having at least two carbon atoms between the halogen atom thereof and the phenol nucleus; $R_2$, $R_3$ and $R_4$ each represent a monovalent radical selected from the above-identified group or a halogen atom, wherein all of $R_1$, $R_2$, $R_3$ and $R_4$ cannot represent hydrogen atoms at the same time and said substituents cannot include an α-carbon atom as a tertiary carbon atom;

(ii) graft copolymer wherein alkenyl aromatic compound is grafted on said homopolymer or said copolymer; and (iii) mixture of said homopolymer, said copolymer or said graft copolymer with other resins; characterized in that the stabilizer is a. a steric hindered phenol represented by the general formula (III or (V)

$$R'''_3\!\!-\!\!\left(\!\!X'\!-\!\!\underset{R''''_2}{\overset{\overset{\displaystyle OH}{|}}{\bigcirc}}\!\!R''''_1\right)_{\!\!n'}\quad\text{(III)}$$

or $$R''''_1\!\!\underset{R''''_2}{\overset{\overset{\displaystyle OH}{|}}{\bigcirc}}\!\!-\!X'\!-\!\!\underset{R''''_2}{\overset{\overset{\displaystyle OH}{|}}{\bigcirc}}\!\!R''''_1$$

wherein
X' represents an alkylene, arylene, alkylenoxy, aryleneoxy radical, —NH—,

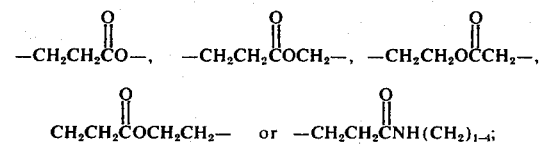

$$CH_2CH_2\overset{O}{\overset{\|}{C}}OCH_2CH_2-\ \ \text{or}\ -CH_2CH_2\overset{O}{\overset{\|}{C}}NH(CH_2)_{1-4};$$

$R''''_1$ and $R''''_2$ represent alkyl radical and at least one is tert.-butyl radical; $R''''_1$ and $R''''_2$ represent tert.-butyl-radical; $R''''_3$ represents a hydrogen, oxygen, sulfur, carbon atom, an alkyl, aryl, triazino,

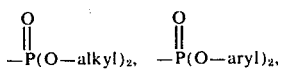

—C(alkylene-O)$_3$P or C(alkylene-S)$_3$P and $n'$ is an integer of 1 – 4, b. a high molecular phosphorous ester which has at least three phosphorous ester-bonds per molecule and obtained by reacting a compound selected from the group consisting of bisphenol A, hydrogenated bisphenol A, alkyl substituted bisphenol A, halogenated bisphenol A, p-xylylene glycol, 1,4-cyclohexane-dimethanol and pentaerythritol with a phosphorous ester or acid represented by the formula I

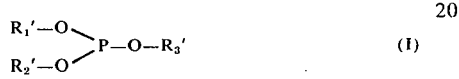

wherein $R'_1$, $R'_2$ and $R'_3$ represent each a hydrogen atom, alkyl, aryl or haloaryl radical; and c. a dicarboxylic acid dihydrazide substitution product represented by the general formula II

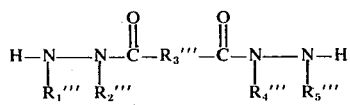

wherein $R'''_1$ and $R'''_5$ represent each an alkyl, acyl, alkoxy, aryl or aroyl radical, $R'''_2$ and $R'''_4$ represent each a hydrogen atom, alkyl or aryl radical and $R'''_3$ represents an alkylene or arylene radical.

24. Stabilized polyphenylene ether type resin composition claimed in claim 23, wherein said steric hindered phenols are represented by one of the general formulae

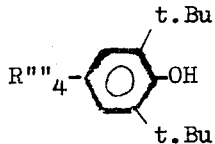

wherein $R''''_4$ represents alkyl radical having 1 – 4 carbon atoms

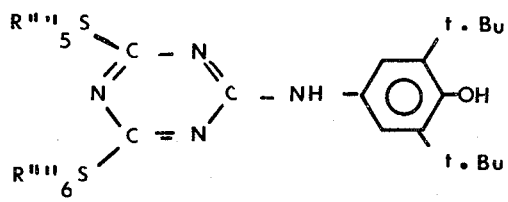

wherein $R''''_5$ and $R''''_6$ represent alkyl radical having 1 – 4 carbon atoms

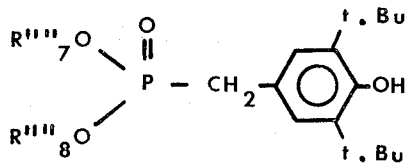

wherein $R''''_7$ and $R''''_8$ represent alkyl radical having 1 – 30 atom

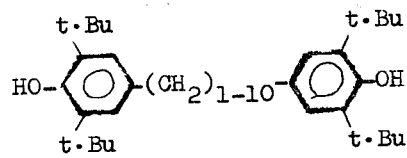

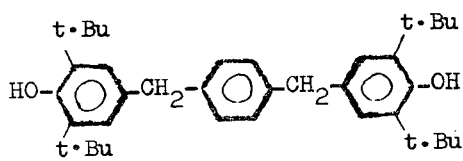

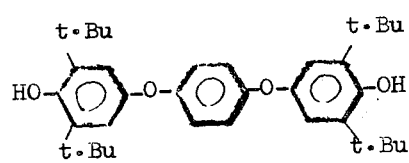

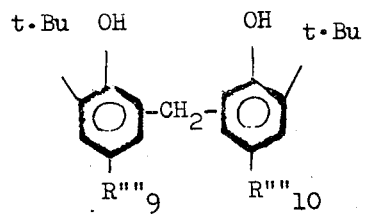

wherein $R''''_9$ and $R''''_{10}$ prepresent methyl or ethyl radical

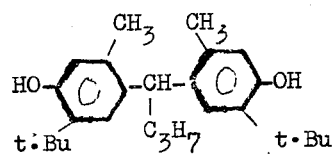

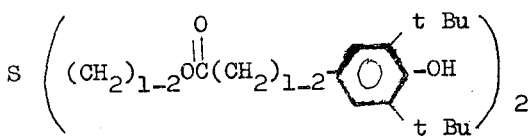

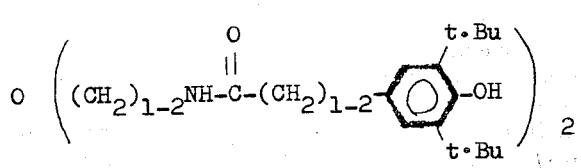

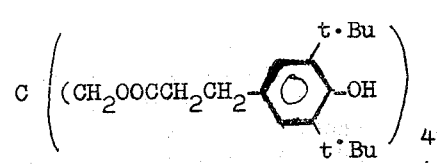

wherein Bu represents butyl.

25. Stabilized polyphenylene ether type resin composition claimed in claim 23, wherein said steric hindered phenol is 2,6-di-tert.butyl-4-methyl phenol.

26. Stabilized polyphenylene ether type resin composition claimed in claim 23, wherein said steric hindered phenol is bis(2-hydroxy-3-tert.butyl-5-methyl) methane or bis(2-hydroxy-3-tert.butyl-5-ethyl)methane.

27. Stabilized polyphenylene ether type resin composition as claimed in claim 23 wherein said high molecular phosphorous esters are represented by one of the general formulae

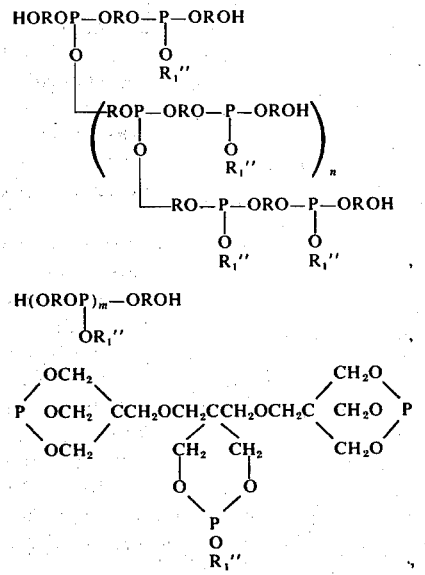

wherein R represents

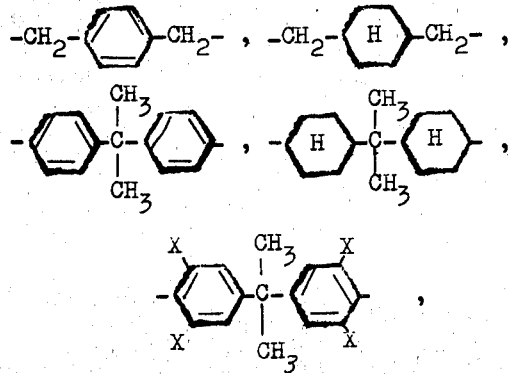

wherein X represents a halogen atom or alkyl radical, $R''_1$ represents an alkyl, aryl or haloaryl radical; n represents zero or a position integer; m represents an integer of at least 3.

28. Stabilized polyphenylene ether type resin composition as claimed in claim 27, wherein $R''_1$ is aryl or haloaryl radical.

29. Stabilized polyphenylene ether type resin composition as claimed in claim 23, wherein said dicarbooxylic acid dihydrazide substitution product is represented by the general formula II, wherein $R'''_1$ and $R'''_5$ represent each an alkyl radical having 1 – 4 carbon atoms, aliphatic acyl radical having 2 – 5 carbon atoms, benzoyl radical, substituted benzoyl radical, alkoxy radical having 1 – 4 carbon atoms, phenyl radical or substituted phenyl radical; $R'''_2$ and $R'''_4$ represent hydrogen atom alkyl radical having 1 – 4 carbon atoms, phenyl radical or substituted phenyl radical; and $R'''_3$ represents an alkylene radical having 1 – 20 carbon atoms, phenylene radical or substituted phenylene radical.

30. Stabilized polyphenylene type resin composition as claimed in claim 23, wherein said dicarboxylic acid dihydrazide substitution product is represented by the general formula II, wherein $R'''_1$ and $R'''_5$ represent acetyl radical; $R'''_2$ and $R'''_4$ represent hydrogen atom; and $R'''_3$ represents an alkylene radical having 1 – 10 carbon atoms.

31. Stabilized polyphenylene ether type resin composition as claimed in claim 23, wherein said dicarboxylic acid dihydrazide is adipic acid-bis-acetyl hydrazide.

32. Stabilized polyphenylene ether resin composition as claimed in claim 23, wherein the amount of said steric hindered phenol is in the range of from 0.01 to 5.0 percent, the amount of said high molecular phosphorous ester is in the range of from 0.01 to 10.0 percent, and the amount of said dicarboxylic acid dihydrazide substitution product is in the range of from 0.01 to 10 percent, by weight of polyphenylene ether resin component.

33. Stabilized polyphenylene ether resin composition as claimed in claim 23, wherein the amount of said steric hindered phenol is in the range of from 0.05 to 2.0 percent, the amount of said high molecular phosphorous ester is in the range of from 0.1 to 3 percent, and the amount of said dicarboxylic acid dihydrazide substitution product is in the range of from 0.05 to 5 percent, by weight of polyphenylene ether resin component.

34. Stabilized polyphenylene ether resin composition as claimed in 1, wherein boron oxide is included as a further stabilizer component in an amount of from 0.01 to 5 percent, preferably from 0.05 to 2 percent by weight of polyphenylene ether resin component.

35. Stabilized polyphenylene ether type resin composition as claimed in claim 1, wherein said homopolymer is poly-2,6-dimethyl-1,4-phenylene ether.

36. Stabilized polyphenylene ether type resin composition as claimed in claim 1, wherein said copolymer is 2,6-dimethyl phenol/2,3,6-trimethyl phenol copolymer.

37. Stabilized polyphenylene ether type resin composition as claimed in claim 1, wherein said graft copolymer is styrene-grafted copolymer.

38. Stabilized polyphenylene ether type resin composition as claimed in claim 1, wherein said mixture is selected from the group consisting polyphenylene ether-polystyrene, polyphenylene ether-polychlorostyrene, polyphenylene ether-polymethylstyrene, polyphenylene ether-rubber modified polystyrene, polyphenylene ether-acrylonitrile/butadiene/styrene copolymer, polyphenylene ether-styrene butadiene rubber, polyphenylene ether-acrylonitrile butadiene rubber, 2,6-dimethyl phenol/2,3,6-trimethyl phenol copolymer-rubber modified polystyrene, poly-2,6-dimethyl phenol-2,3,6-trimethyl phenol/2,6-dimethyl phenol copolymer-polystyrene, styrene-grafted polyphenylene ether-rubber modified polystyrene, polyphenylene ether-polystyrene-styrene butadiene rubber and polyphenylene ether-polystyrene-polycarbonate-polyolefine.

39. Stabilized polyphenylene ether resin composition as claimed in claim 1, wherein other stabilizer, an ultraviolet absorbing agent, metalic soap, pigments, dyes, plasticizers, flame retarder or a mixture of these are added as additives.

40. Molded products produced from the stabilized polyphenylene ether resin composition as claimed in claim 1.

41. Stabilized polyphenylene ether resin composition as claimed in claim 43, wherein boron oxide is included as a further stabilizer component in an amount of from 0.01 to 5 per cent, preferably from 0.05 to 2 per cent by weight of polyphenylene ether resin component.

42. Stabilized polyphenylene ether resin composition as claimed in claim 15, wherein boron oxide is included as a further stabilizer component in an amount of from 0.01 to 5 per cent, preferably from 0.05 to 2 per cent by weight of polyphenylene ether resin component.

43. Stabilized polyphenylene ether resin composition as claimed in claim 23, wherein boron oxide is included as a further stabilizer component in an amount of from 0.01 to 5 per cent, preferably from 0.05 to 2 per cent by weight of polyphenylene ether resin component.

44. Stabilized polyphenylene ether type resin composition as claimed in claim 6, wherein said homopolymer is poly-2,6-dimethyl-1,4-phenylene ether.

45. Stabilized polyphenylene ether type resin composition as claimed in claim 15, wherein said homopolymer is poly-2,6-dimethyl-1,4-phenylene ether.

46. Stabilized polyphenylene ether type resin composition as claimed in claim 23, wherein said homopolymer is poly-2,6-dimethyl-1,4-phenylene ether.

47. Stabilized polyphenylene ether type resin composition as claimed in claim 6, wherein said copolymer is 2,6-dimethyl phenol/2,3,6-trimethyl phenol copolymer.

48. Stabilized polyphenylene ether type resin composition as claimed in claim 15, wherein said copolymer is 2,6-dimethyl phenol/2,3,6-trimethyl phenol copolymer.

49. Stabilized polyphenylene ether type resin composition as claimed in claim 45, wherein said copolymer is 2,6-dimethyl phenol/2,3,6-trimethyl phenol copolymer.

50. Stabilized polyphenylene ether type resin composition as claimed in claim 6, wherein said graft copolymer is styrene-grafted copolymer.

51. Stabilized polyphenylene ether type resin composition as claimed in claim 15, wherein said graft copolymer is styrene-grafted copolymer.

52. Stabilized polyphenylene ether type resin composition as claimed in claim 23, wherein said graft copolymer is styrene-grafted copolymer.

53. Stabilized polyphenylene ether type resin composition as claimed in claim 6, wherein said mixture is selected from the group consisting polyphenylene ether-polystyrene, polyphenylene ether-polychlorostyrene, polyphenylene ether-polymethyl-styrene, polyphenylene ether-rubber modified polystyrene, polyphenylene ether-acrylonitrile/butadiene/styrene copolymer, polyphenylene ether-styrene butadiene rubber, polyphenylene ether-acrylonitrile butadiene rubber, 2,6-dimethyl phenol/2,3,6-trimethyl phenol copolymer-rubber modified polystyrene, poly-2,6-dimethyl phenol-2,3,6-trimethyl phenol/2,6-dimethyl phenol copolymer-polystyrene, styrene-grafted polyphenylene ether-rubber modified polystyrene, polyphenylene ether-polystyrene-styrene butadiene rubber and polyphenylene ether-polystyrene-polycarbonate-polyolefine.

54. Stabilized polyphenylene ether type resine composition as cliamed in claim 15, wherein said mixture is selected from the group consisting polyphenylene ether-polystyrene, polyphenylene ether-polystyrene, polyphenylene ether-polychlorostyrene, polyphenylene ether-polymethyl-styrene, polyphenylene ether-rubber modified polystyrene, polyphenylene ether-acrylonitrile/butadiene/styrene copolymer, polyphenylene ether-styrene butadiene rubber, polyphenylene ether-acrylonitrile butadiene rubber, 2,6-dimethyl phenol/2,3,6-trimethyl phenol copolymer-rubber modified polystyrene, poly-2,6-dimethyl phenol-2,3,6-trimethyl phenol/2,6-dimethyl phenol copolymer-polystyrene, styrene-grafted polyphenylene ether-rubber modified polystyrene, polyphenylene ether-polystyrene-styrene butadiene rubber and polyphenylene ether-polystyrene-polycarbonate-polyolefine.

55. Stabilized polyphenylene ether type resin composition as claimed in claim 23, wherein said mixture is selected from the group consisting polyphenylene ether-polystyrene, polyphenylene ether-polychlorostyrene, polyphenylene ether-polymethyl-styrene, polyphenylene ether-rubber modified polystyrene, polyphenylene ether-acrylonitrile/butadiene/styrene copolymer, polyphenylene ether-styrene butadiene rubber, polyphenylene ether-acrylonitrile butadiene rubber, 2,6-dimethyl phenol/2,3,6-trimethyl phenol copolymer-rubber modified polystyrene, poly-2,6-dimethyl phenol-2,3,6-trimethyl phenol/2,6-dimethyl phonol copolymer-polystyrene, styrene-grafted polyphenylene ether-rubber modified polystyrene, polyphenylene ether-polystyrene-styrene butadiene rubber and polyphenylene ether-polystyrene-polycarbonate-polyolefin.

56. Stabilized polyphenylene ether resin composition as claimed in claim 6, wherein other stabilizer, an ultraviolet absorbing agent, metalic soap, pigments, dyes, plasticizers, flame retarder or a mixture of these are added as additives.

57. Stabilized polyphenylene ether resin composition as claimed in claim 15, wherein other stabilizer, an ultraviolet absorbing agent, metalic soap, pigments, dyes, plasticizers, flame retarder or a mixture of these are added as additives.

58. Stabilized polyphenylene ether resin composition as claimed in claim 23, wherein other stabilizer, an ultraviolet absorbing agent, metalic soap, pigments, dyes, plasticizers, flame retarder or a mixture of these are added as additives.

59. Molded products produced from the stabilized polyphenylene ether resin composition as claimed in claim 6.

60. Molded products produced from the stabilized polyphenylene ether resin composition as claimed in claim 15.

61. Molded products produced from the stabilized polyphenylene ether resin composition as claimed in claim 23.

62. Stabilized polyphenylene ether type resin composition as claimed in claim 23, wherein said dicarboxylic acid dihydrazide substitution product is represented by the general formula II, wherein $R_1'''$ and $R_5'''$ represent each an alkyl radial having 1–20 carbon atoms, aliphatic acyl radical having 2–21 carbon atoms, benzoyl radical, substituted benzoyl raidcal, alkoxy radical having 1-20 carbon atoms, phenyl radical or substituted phenyl radical; $R_2'''$ and $R_4'''$ represent a hydrogen atom, alkyl radical having 1–20 carbon atoms, phenyl radical or substituted phenyl radical; and $R_3'''$ represents an alkylene radical having 1–20 carbon atoms, phenylene radical or substituted phenylene radical.

* * * * *